(12) United States Patent
Sugahara et al.

(10) Patent No.: US 7,961,904 B2
(45) Date of Patent: Jun. 14, 2011

(54) APPARATUS FOR EMBEDDING AND REPRODUCING WATERMARK INTO AND FROM CONTENTS DATA

(75) Inventors: Takayuki Sugahara, Yokosuka (JP); Masayoshi Nishitani, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 1415 days.

(21) Appl. No.: 11/442,222

(22) Filed: May 30, 2006

(65) Prior Publication Data

US 2006/0215876 A1 Sep. 28, 2006

Related U.S. Application Data

(62) Division of application No. 10/067,920, filed on Feb. 8, 2002, now Pat. No. 7,113,612.

(30) Foreign Application Priority Data

Mar. 22, 2001 (JP) .................................. 2001-83733
Mar. 29, 2001 (JP) .................................. 2001-96441

(51) Int. Cl.
*G06K 9/00* (2006.01)
*H04N 7/167* (2011.01)

(52) U.S. Cl. ....................................... 382/100; 380/210

(58) Field of Classification Search .................. 382/100, 382/232–254; 380/210–245
See application file for complete search history.

(56) References Cited

U.S. PATENT DOCUMENTS

| | | | |
|---|---|---|---|
| 5,530,759 A | 6/1996 | Braudaway et al. | |
| 5,825,892 A | 10/1998 | Braudaway et al. | |
| 5,991,426 A * | 11/1999 | Cox et al. | 382/100 |
| 6,055,321 A * | 4/2000 | Numao et al. | 382/100 |
| 6,122,403 A | 9/2000 | Rhoads | |
| 6,246,775 B1 | 6/2001 | Nakamura et al. | |
| 6,590,996 B1 | 7/2003 | Reed et al. | |
| 6,671,387 B1 | 12/2003 | Chen et al. | |
| 6,704,431 B1 | 3/2004 | Ogawa et al. | |
| 7,321,666 B2 * | 1/2008 | Kunisa | 382/100 |

FOREIGN PATENT DOCUMENTS

| | | |
|---|---|---|
| JP | 11-296661 | 10/1999 |
| JP | 11-298715 | 10/1999 |

OTHER PUBLICATIONS

"A Copyright Information Embedding Method using DCT for Digital Movies" by H. Ogawa et al; The 1997 Symposium on Cryptography and Information Security—31G; pp. 1-4.
"A Watermarking scheme to image data by PN sequence" by J. Ohnishi; The 1997 Symposium in Cryptography and Information Security—26B; pp. 1-8.

* cited by examiner

*Primary Examiner* — Vu Le
*Assistant Examiner* — Alex Liew
(74) *Attorney, Agent, or Firm* — Louis Woo

(57) ABSTRACT

An apparatus for embedding a watermark into contents data includes a parameter converting device for converting a parameter of first contents data to generate second contents data. A mixing device operates for embedding parameter information into the second contents data as watermark information. The parameter information represents a condition of the conversion of the parameter by the parameter converting device. The watermark information may include copyright information.

6 Claims, 15 Drawing Sheets

| 1 | 0 | 1 |
|---|---|---|
| 0 | 1 | 0 |
| 1 | 0 | 1 |

FIG. 9

| 0 | 1 | 0 |
|---|---|---|
| 1 | 0 | 1 |
| 0 | 1 | 0 |

FIG. 19

| 1 | 2 | 3 | 4 |
|---|---|---|---|
| 5 | 6 | 7 | 8 |
| 9 | 10 | 11 | 12 |
| 13 | 14 | 15 | 16 |

FIG. 20

| 1 | 4 | 5 | 8 |
|---|---|---|---|
| 3 | 2 | 6 | 7 |
| 9 | 10 | 13 | 15 |
| 11 | 12 | 14 | 16 |

FIG. 21

| |
|---|
| 1 |
| 2 |
| 3 |
| 4 |
| 5 |
| 6 |
| 7 |
| 8 |
| 9 |
| 10 |
| 11 |
| 12 |

FIG. 22

| |
|---|
| 1 |
| 3 |
| 2 |
| 4 |
| 5 |
| 7 |
| 6 |
| 8 |
| 10 |
| 9 |
| 11 |
| 12 |

APPARATUS FOR EMBEDDING AND REPRODUCING WATERMARK INTO AND FROM CONTENTS DATA

BACKGROUND OF THE INVENTION

1. Field of the Invention

This invention relates to an apparatus for embedding or inserting a watermark into contents data such as picture data, audio data, audio visual data, or multimedia data. In addition, this invention relates to an apparatus for reproducing or extracting a watermark from watermarked contents data. Furthermore, this invention relates to a recording medium for storing watermarked contents data.

2. Description of the Related Art

H. Ogawa et al. have reported "A Copying Information Embedding Method using DCT for Digital Movies", SCIS'97-31G, which discloses watermarking methods suitable for MPEG bit streams. The watermarking methods are based on modifying DCT coefficients, motion vectors, and quantizer matrices. Regarding contents data into which watermark information has been inserted by the DCT-coefficient-modifying watermarking method reported by H. Ogawa et al., the accuracy of reproducing the watermark information from the contents data is considerably low when the synchronization with DCT-sampling units (DCT blocks) fails to be acquired. The failure of the acquisition of the synchronization causes DCT blocks to shift from true positions by, for example, one pixel or one line in a frame. It is assumed that picture data which have been watermarked by one of the methods reported by H. Ogawa et al. are subjected to affine transformation to slightly rotate or distort a picture. It tends to be difficult to accurately extract the watermark from the transformation-resultant watermarked picture data.

J. Ohnishi et al. have reported "A Watermarking Scheme to Image Data by PN Sequence", SCIS'97-26B, which discloses a data hiding method using a PN sequence in the spread spectrum technique. In the data hiding method, an original image signal is converted into a spread spectrum in response to a PN sequence. A narrow band signal to stand for a signature is added to the spread spectrum, that is, a wideband channel of which an original image is spread. When the signature-added spread spectrum is inversely converted into the normal image by the PN sequence, the signature signal is spread over the normal-image signal. In other words, the signature signal is embedded in the normal-image signal. The spread signature signal is low in power, and hence hardly acts as noise with respect to the original image. Accordingly, the signature-added image is substantially the same as the original image. When the signature-added image signal is spread by the PN sequence, the signature signal is reproduced.

SUMMARY OF THE INVENTION

It is a first object of this invention to provide an improved apparatus for embedding a watermark into contents data.

It is a second object of this invention to provide an improved apparatus for reproducing a watermark from watermarked contents data.

It is a third object of this invention to provide an improved recording medium for storing watermarked contents data.

A first aspect of this invention provides an apparatus for embedding a watermark into contents data. The apparatus comprises parameter converting means for converting a parameter of first contents data to generate second contents data; and mixing means for embedding parameter information into the second contents data as watermark information, the parameter information representing a condition of the conversion of the parameter by the parameter converting means.

A second aspect of this invention is based on the first aspect thereof, and provides an apparatus wherein the parameter converting means comprises means for converting a parameter of segments of the first contents data which correspond to pixels forming a specified picture portion.

A third aspect of this invention is based on the first aspect thereof, and provides an apparatus wherein the mixing means comprises means for embedding copyright information and the parameter information into the second contents data as watermark information.

A fourth aspect of this invention is based on the first aspect thereof, and provides an apparatus wherein the parameter converting means comprises means for converting a parameter of segments of the first contents data which correspond to pixels at watermark-embedded positions, and the parameter information includes a parameter value indicative of a rate of the conversion of the parameter, wherein the mixing means comprises a first mixer and a second mixer, wherein the first mixer comprises pattern generating means for generating bits representing a predetermined bit pattern, specified-bit detecting means for detecting bits in the second contents data as specified bits which correspond to the pixels at the watermark-embedded positions, calculating means for calculating a desired bit pattern represented by the specified bits in response to the predetermined bit pattern and a specified bit pattern, and changing means for changing the specified bits to represent the desired bit pattern to convert the second contents data into bit-pattern-added contents data, and wherein the second mixer comprises means for embedding copyright information and the parameter information into the bit-pattern-added contents data as watermark information.

A fifth aspect of this invention provides an apparatus for reproducing a watermark from watermarked contents data generated by converting a parameter of original contents data to get conversion-resultant original data and embedding parameter information into the conversion-resultant original data as watermark information, the parameter information representing a condition of the conversion of the parameter. The apparatus comprises parameter detecting means for detecting the parameter information from the watermarked contents data; and parameter inversely converting means for inversely converting the watermarked contents data into the original contents data in response to the parameter information detected by the parameter detecting means.

A sixth aspect of this invention is based on the fifth aspect thereof, and provides an apparatus wherein the watermarked contents data include copyright information and the parameter information as the watermark information, and further comprising copyright information detecting means for detecting the copyright information from the watermarked contents data.

A seventh aspect of this invention is based on the fifth aspect thereof, and provides an apparatus wherein the watermarked contents data have been generated by converting a parameter of segments of the original contents data which correspond to pixels at watermark-embedded positions, and the parameter information includes a parameter value indicative of a ratio of the conversion of the parameter, wherein the parameter detecting means comprises pattern generating means for generating bits representing a predetermined bit pattern, operation means for selecting specified bits among bits in the watermarked contents data, for repetitively changing the currently-selected specified bits from ones to others, and for executing given logical operation between the predetermined bit pattern and a bit pattern represented by the currently-selected specified bits, embedding-position detecting means for deciding whether or not a result of the given logical operation is equal to a specified bit pattern, and for, when the result of the given logical operation is equal to the specified bit pattern, deciding that the currently-selected specified bits correspond to a watermark-embedded position, and parameter-value detecting means for detecting the parameter value in the detected parameter information, wherein the parameter inversely converting means comprises an inverse converter for, in response to the parameter value detected by the parameter-value detecting means, inversely converting the parameter of the segments of the watermarked contents data which correspond to the pixels at the watermark-embedded positions decided by the embedding-position detecting means.

An eighth aspect of this invention is based on the seventh aspect thereof, and provides an apparatus wherein the predetermined bit pattern and the specified bit pattern remain unchanged when being rotated through one of 90, 180, and 270 degrees.

An eighth aspect of this invention provides a recording medium for storing watermarked data including contents data and watermark information, the contents data having a parameter converted from an original value, the watermark information being embedded in the contents data, the watermark information including parameter information representing a condition of the conversion of the parameter from the original value.

A tenth aspect of this invention is based on the ninth aspect thereof, and provides a recording medium wherein a parameter of segments of the contents data which correspond to pixels at watermark-embedded positions is converted from an original value, and the parameter information includes a parameter value indicative of a rate of the conversion of the parameter, wherein the watermarked data are produced by generating bits representing a predetermined bit pattern, detecting bits in the contents data as specified bits which correspond to the pixels at the watermark-embedded positions, calculating a desired bit pattern represented by the specified bits in response to the predetermined bit pattern and a specified bit pattern, changing the specified bits to represent the desired bit pattern to convert the contents data into bit-pattern-added contents data, and embedding the parameter information into the bit-pattern-added contents data as watermark information.

An eleventh aspect of this invention provides a recording medium for storing watermarked data including contents data and watermark information, the contents data having a parameter converted from an original value, the watermark information being embedded in the contents data, the watermark information including copyright information and parameter information representing a condition of the conversion of the parameter from the original value.

A twelfth aspect of this invention provides an apparatus for embedding a watermark into contents data. The apparatus comprises address generating means for generating a jump-destination address; information generating means for generating copyright information; mixing means for embedding the jump-destination address generated by the address generating means and the copyright information generated by the information generating means into input contents data as watermark information to generate first watermark-added contents data; an encoder for compressively encoding the first watermark-added contents data generated by the mixing means into second watermark-added contents data; and rearranging means for rearranging unit portions of the second watermark-added contents data generated by the encoder in response to the jump-destination address generated by the address generating means, wherein the unit portions are defined by the encoding by the encoder.

A thirteenth aspect of this invention provides an apparatus for embedding a watermark into contents data. The apparatus comprises address generating means for generating a jump-destination address; information generating means for generating copyright information; mixing means for embedding the jump-destination address generated by the address generating means and the copyright information generated by the information generating means into input contents data as watermark information to generate watermark-added contents data; and rearranging means for rearranging unit portions of the watermark-added contents data generated by the mixing means in response to the jump-destination address generated by the address generating means, wherein the unit portions represent respective divided regions composing a still-picture frame.

A fourteenth aspect of this invention provides an apparatus for reproducing a watermark from watermarked contents data. The apparatus comprises rearranging means for rearranging unit portions of first watermark-added contents data in an original order to generate second watermark-added contents data in response to a jump-destination address; watermark information detecting means for detecting watermark information from the second watermark-added contents information; address calculating means for calculating the jump-destination address from a related portion of the watermark information detected by the watermark information detecting means, and for notifying the calculated jump-destination address to the rearranging means; a decoder for decoding the second watermark-added contents; and copyright information detecting means for detecting copyright information from the watermark information detected by the watermark information detecting means.

A fifteenth aspect of this invention provides an apparatus for reproducing a watermark from watermarked contents data. The apparatus comprises rearranging means for rearranging unit portions of first watermark-added contents data in an original order to generate second watermark-added contents data in response to a jump-destination address, wherein the unit portions represent respective divided regions composing a still-picture frame; watermark information detecting means for detecting watermark information from the second watermark-added contents information; address calculating means for calculating the jump-destination address from a related portion of the watermark information detected by the watermark information detecting means, and for notifying the calculated jump-destination address to the rearranging means; and copyright information detecting means for detecting copyright information from the watermark information detected by the watermark information detecting means.

A sixteenth aspect of this invention provides a recording medium for storing watermarked data including contents data and watermark information, the contents data resulting from a prescribed encoding procedure, the watermark information being embedded in the contents data, the watermark information including a jump-destination address and copyright information, the contents data having unit portions arranged in a scrambled order different from an original order, the unit portions being defined by the prescribed encoding procedure, the jump-destination address being for enabling the unit portions to be rearranged in the original order.

A seventeenth aspect of this invention provides a recording medium for storing watermarked data including contents data and watermark information, the contents data representing a still picture, the watermark information being embedded in the contents data, the watermark information including a jump-destination address and copyright information, the contents data having unit portions arranged in a scrambled order different from an original order and representing respective divided regions composing the still picture, the jump-destination address being for enabling the unit portions to be rearranged in the original order.

BRIEF DESCRIPTION OF THE DRAWINGS

FIG. 6 is a diagram of 1-pixel-corresponding 8-bit segments of a luminance signal in which only the two lower bits among 8 bits per luminance pixel is selected as bits into which a watermark fragment is embedded.

FIG. 7 is a diagram of 1-pixel-corresponding 8-bit segments of a luminance signal in which only the three lower bits among 8 bits per luminance pixel is selected as bits into which a watermark fragment is embedded.

FIG. 8 is a diagram of an example of a fixed 3-by-3-bit pattern produced by a fixed-pattern generator in FIG. 2.

FIG. 9 is a diagram of a specified 3-by-3-bit pattern used in the apparatus of FIG. 1.

FIG. 19 is a diagram of sub-regions composing a frame and being arranged in a raster scanning order.

FIG. 20 is a diagram of sub-regions composing a frame and being arranged in an order different from a raster scanning order.

FIG. 21 is a diagram of sub-regions composing a frame and being arranged in a raster scanning order.

FIG. 22 is a diagram of sub-regions composing a frame and being arranged in an order different from a raster scanning order.

DETAILED DESCRIPTION OF THE INVENTION

First Embodiment

Figure 1:
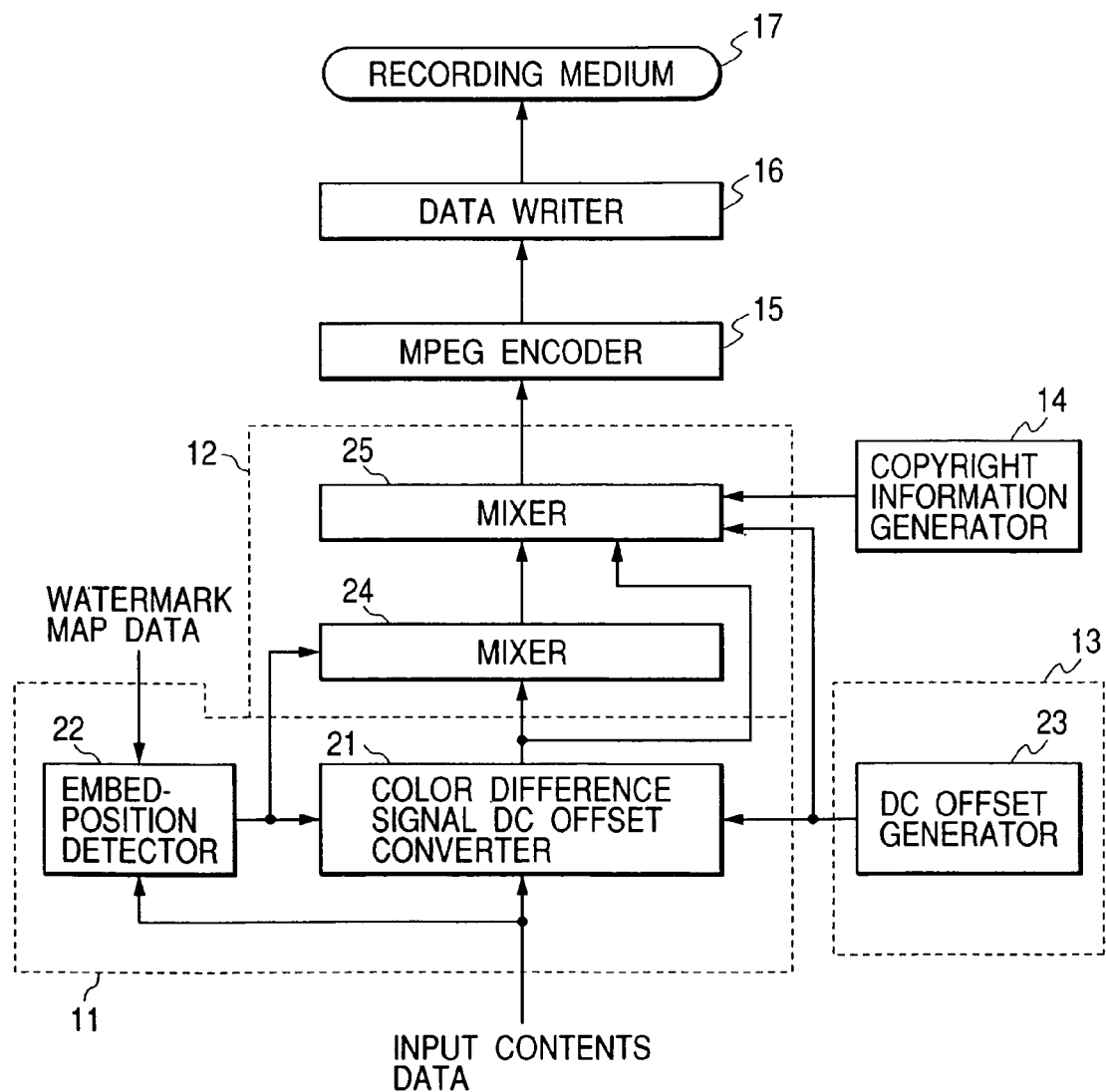
FIG. 1 is a block diagram of an apparatus for embedding a watermark into contents data according to a first embodiment of this invention.

FIG. 1 shows an apparatus for embedding or inserting a watermark into contents data according to a first embodiment of this invention. The apparatus of FIG. 1 includes a parameter converter 11, a watermark mixer 12, a parameter generator 13, a copyright information generator 14, an MPEG encoder 15, and a data writer 16. Here, "MPEG" is short for "Moving Picture Experts Group". The parameter converter 11 has a color-difference-signal DC offset converter 21 and an embedding-position detector 22. Here, "DC" is short for "direct current". The watermark mixer 12 has a first sub-mixer 24 and a second sub-mixer 25. The parameter generator 13 has a DC offset generator 23.

The color-difference-signal DC offset converter 21 is connected with the embedding-position detector 22, the DC offset generator 23, the first sub-mixer 24, and the second sub-mixer 25. The embedding-position detector 22 is connected with the first sub-mixer 24. The DC offset generator 23 is connected with the second sub-mixer 25. The first sub-mixer 24 is connected with the second sub-mixer 25. The second sub-mixer 25 is connected with the copyright information generator 14 and the MPEG encoder 15. The MPEG encoder 15 is connected with the data writer 16.

Figure 2:
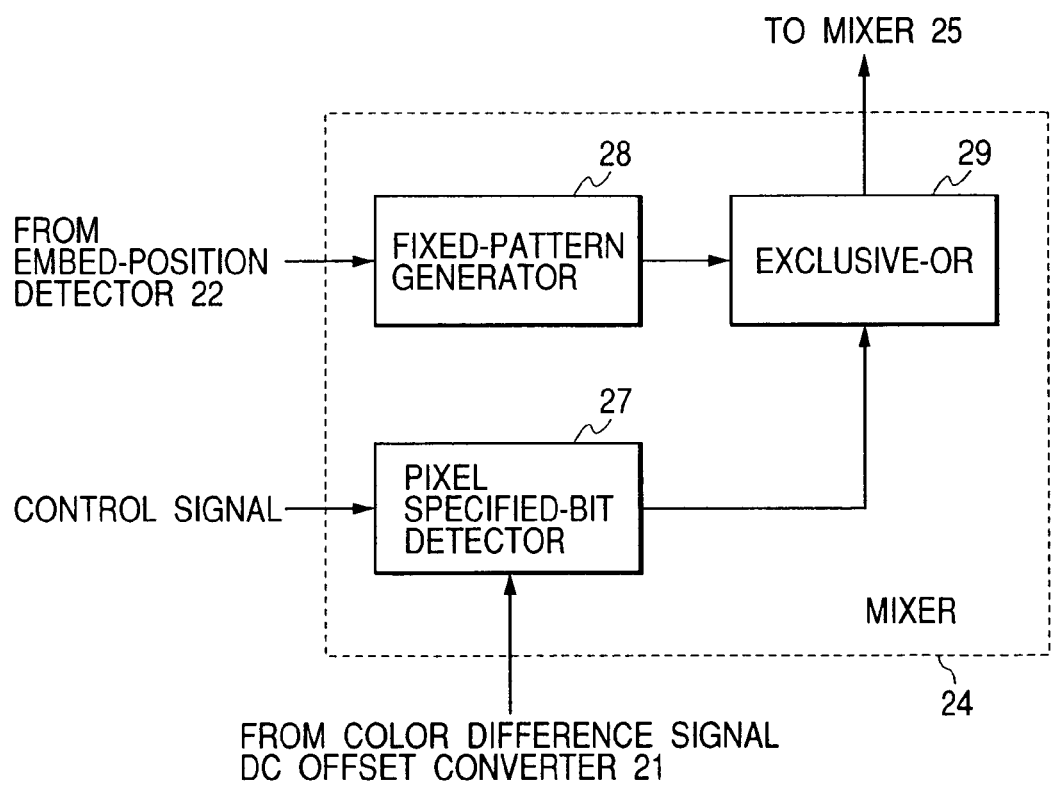
FIG. 2 is a block diagram of a sub-mixer in FIG. 1.

As shown in FIG. 2, the first sub-mixer 24 has a pixel specified-bit detector 27, a fixed-pattern generator 28, and an exclusive-OR device 29. The pixel specified-bit detector 27 is connected with the color-difference-signal DC offset converter 21 (see FIG. 1) and the exclusive-OR device 29. The fixed-pattern generator 28 is connected with the embedding-position detector 22 (see FIG. 1) and the exclusive-OR device 29. The exclusive-OR device 29 is connected with the second sub-mixer 25 (see FIG. 1).

Input contents data representing an original picture or a sequence of original pictures are fed to the color-difference-signal DC offset converter 21 and the embedding-position detector 22. The original picture data (the input contents data) are composed of a luminance signal Y and color difference signals Cb and Cr.

Figure 3:
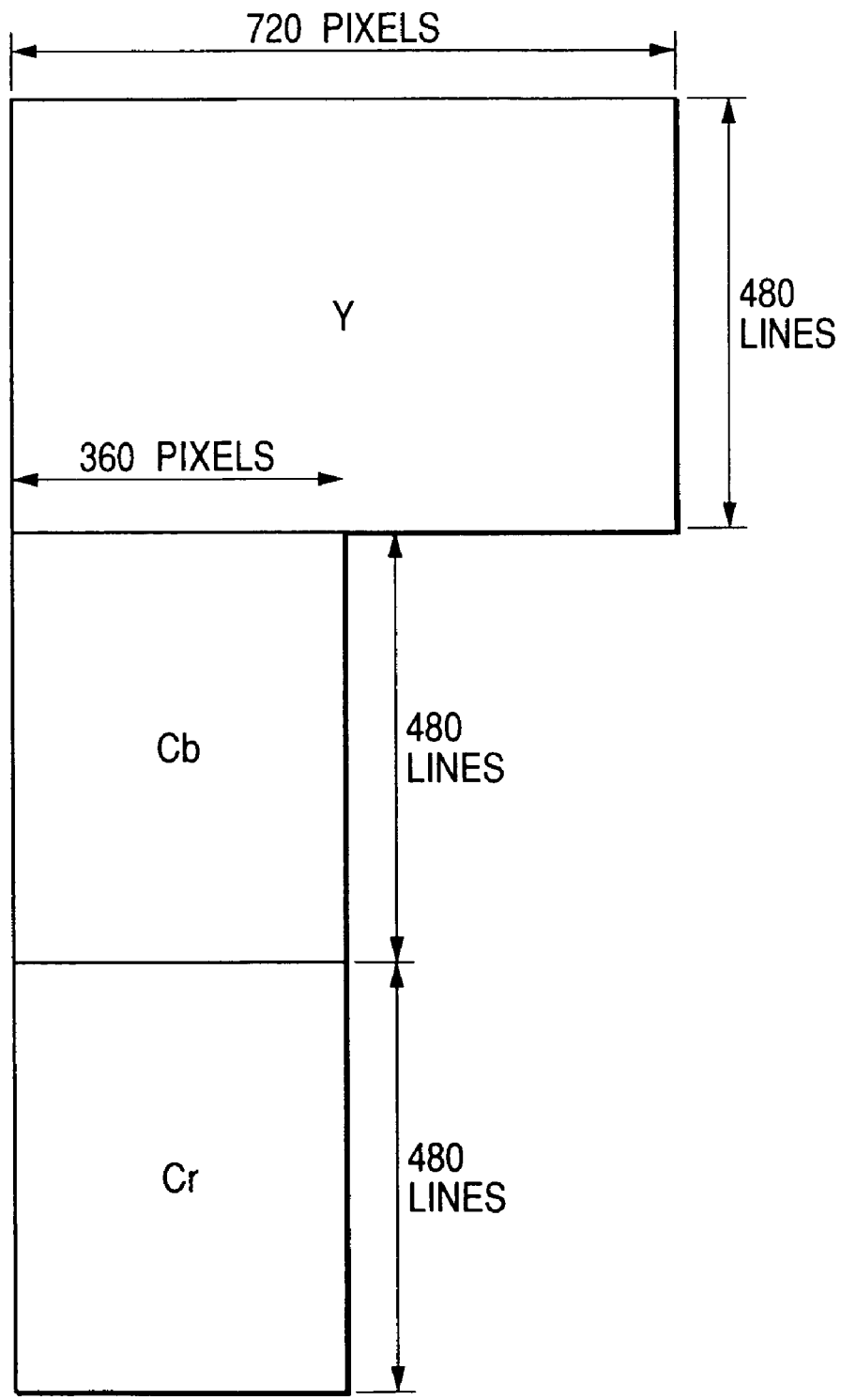
FIG. 3 is a diagram of a 1-frame-corresponding picture represented by a luminance signal Y, a 1-frame-corresponding picture represented by a first color difference signal Cb, and a 1-frame-corresponding picture represented by a second color difference signal Cr.

As shown in FIG. 3, one picture (one frame) represented by the luminance signal Y has 720 pixels in a horizontal direction, and 480 lines in a vertical direction. One picture (one frame) represented by the color difference signal Cb has 360 pixels in the horizontal direction, and 480 lines in the vertical direction. Similarly, one picture (one frame) represented by the color difference signal Cr has 360 pixels in the horizontal direction, and 480 lines in the vertical direction. Each of the luminance signal Y and the color difference signals Cb and Cr has 8 bits per pixel.

Figure 4:
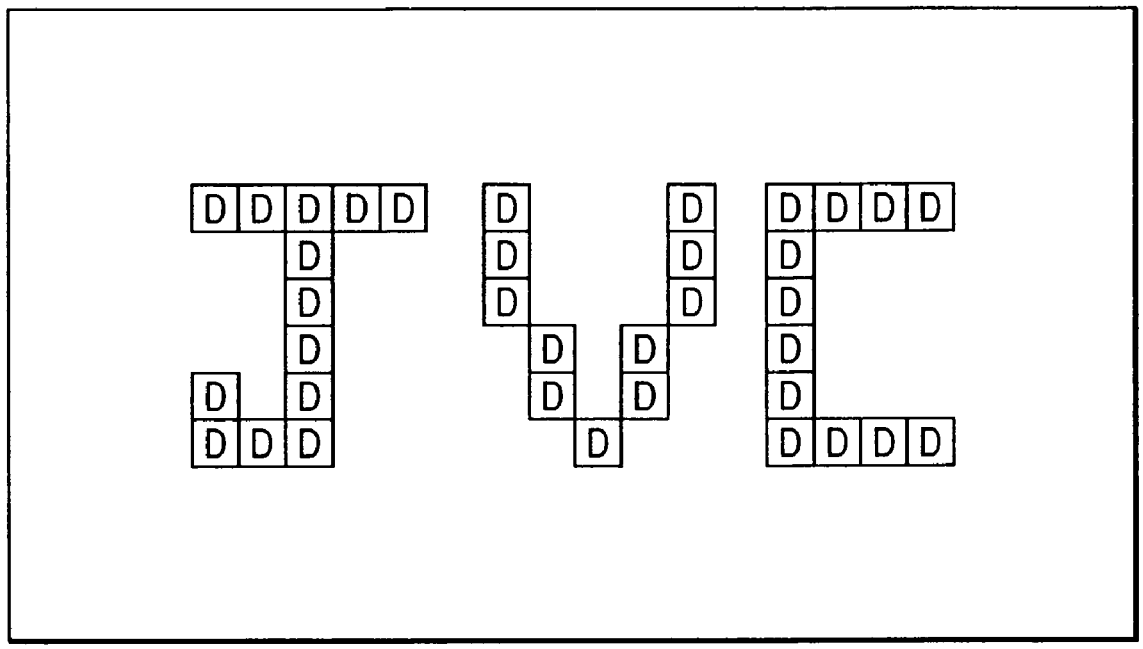
FIG. 4 is a diagram of an example of a watermark.

Map data representing a watermark are fed to the embedding-position detector 22. FIG. 4 shows an example of the watermark, "JVC", which is represented by the map data. A frame represented by the map data is composed of divided rectangular blocks each having, for example, 81 neighboring luminance pixels being 9 luminance pixels in a horizontal direction by 9 luminance pixels in a vertical direction. Prescribed blocks D selected among the divided rectangular blocks represent the watermark, "JVC". The map data indicate the positions of the prescribed blocks D with respect to the frame. The positions of the prescribed blocks D correspond to watermark-embedding positions.

The watermark map data may be stored in a memory. In this case, the watermark map data are fed from the memory to the embedding-position detector 22. The watermark map data may be fed to the embedding-position detector 22 from an external.

The embedding-position detector 22 derives the watermark-embedding positions from the watermark map data. The embedding-position detector 22 converts the watermark-embedding positions into addresses (watermark-embedding addresses) defined in the case where the prescribed blocks D are scanned in a raster scanning order. The embedding-position detector 22 notifies the watermark-embedding addresses to the color-difference-signal DC offset converter 21 and the fixed-pattern generator 28 in the first sub-mixer 24.

The DC offset generator 23 produces an 8-bit signal representing a DC offset value which can change from −128 to +127 in decimal. The DC offset value corresponds to an increase or a decrease expressed in unit of percent (%). For example, the DC offset value is set to a 20% increase. The DC offset generator 23 outputs the DC-offset-value signal to the color-difference-signal DC offset converter 21 and the second sub-mixer 25.

The color-difference-signal DC offset converter 21 processes only "red" components of the color difference signals in the input contents data which represent pixels at the watermark-embedding addresses notified by the embedding-position detector 22. In other words, the color-difference-signal DC offset converter 21 processes only "red" components of the input contents data which correspond to the prescribed blocks D representing the watermark, "JVC". Specifically, the color-difference-signal DC offset converter 21 increases or decreases the DC values of the "red" signal components in accordance with the DC offset value represented by the output signal from the DC offset generator 23. For example, the DC values of the "red" signal components are increased by 20%. In this way, the "red" signal components corresponding to the prescribed blocks D are converted from their original states. On the other hand, the color-difference-signal DC offset converter 21 does not process "blue" and "green" components of the color difference signals in the input contents data which represent pixels in the watermark-embedding positions. Also, the color-difference-signal DC offset converter 21 does not process the luminance signal in the input contents data which represent pixels at the watermark-embedding addresses. Furthermore, the color-difference-signal DC offset converter 21 does not process the input contents data which represent pixels at addresses different from the watermark-embedding addresses. The color-difference-signal DC offset converter 21 feeds the processing-resultant contents data (the conversion-resultant contents data) to the pixel specified-bit detector 27 and the second sub-mixer 25.

For every pixel represented by the luminance signal Y in the conversion-resultant contents data fed from the color-difference-signal DC offset converter 21, the pixel specified-bit detector 27 determines the number "N" of lower bits starting from the lowest bit among 8 bits corresponding to the pixel in accordance with a desired strength (intensity) of an embedded watermark relative to an original picture. Here, "N" denotes a natural number smaller than 8. A fragment of a watermark can be embedded into the determined N lower bits. The pixel specified-bit detector 27 receives a control signal representing the desired strength of an embedded watermark. The control signal is fed from a suitable device such as an input device which can be accessed by a user.

Figure 5:
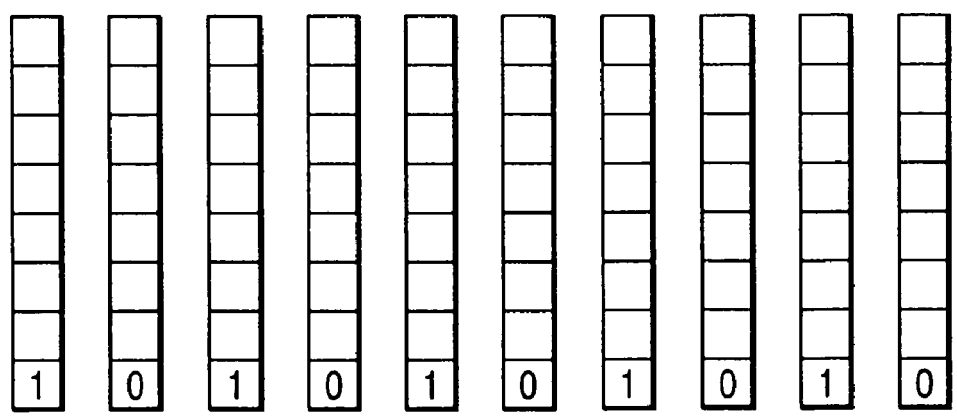
FIG. 5 is a diagram of 1-pixel-corresponding 8-bit segments of a luminance signal in which only the lowest bit among 8 bits per luminance pixel is selected as a bit into which a watermark fragment is embedded.
Figures 6, 7, 8, 9:
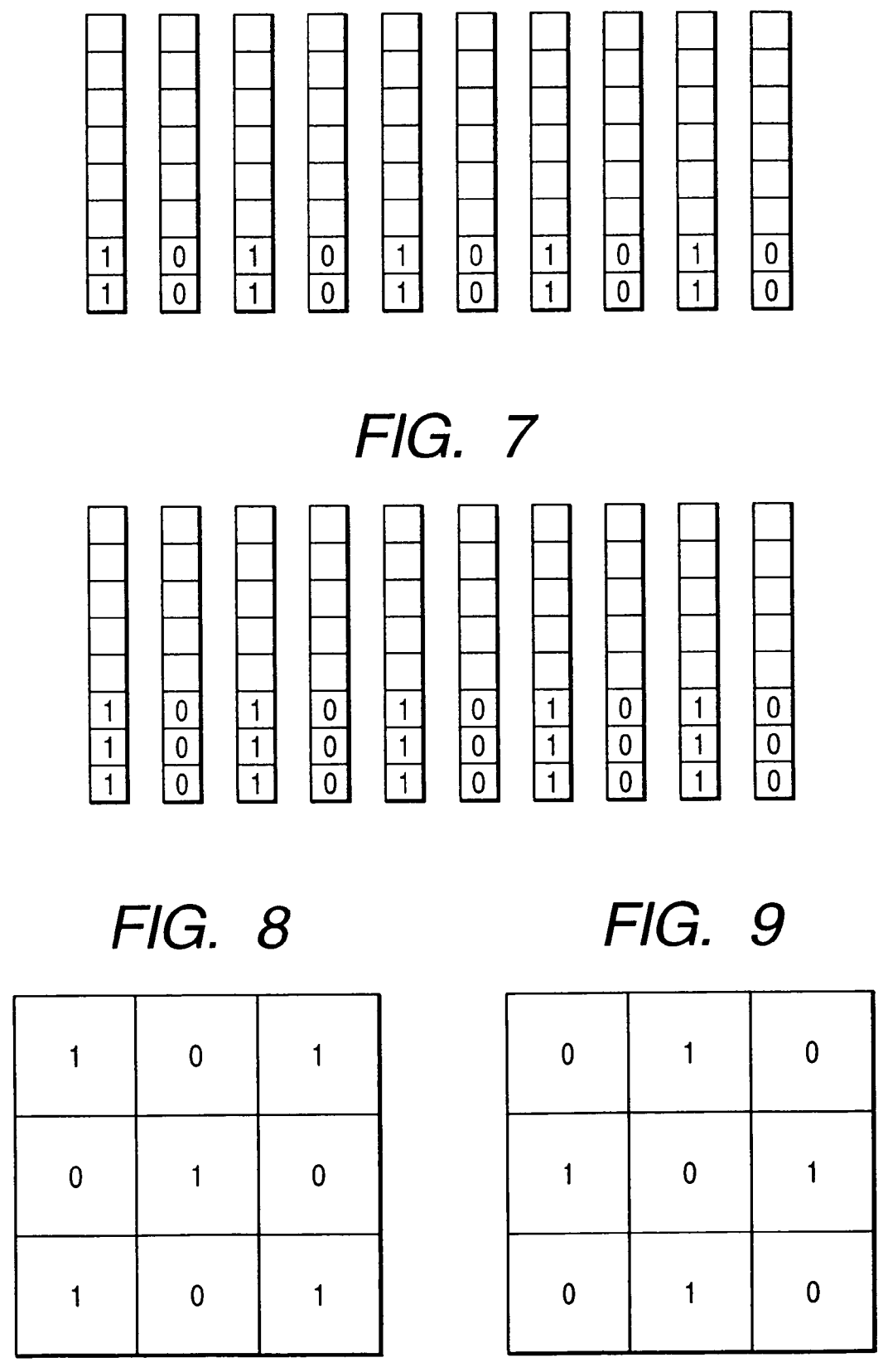

When the desired strength of an embedded watermark relative to an original picture is the smallest, the pixel specified-bit detector 27 sets the number N to 1 and therefore designates and selects only the lowest bit among 8 bits per luminance pixel as a bit into which a watermark fragment can be embedded as shown in FIG. 5. When the desired strength of an embedded watermark relative to an original picture is the second smallest, the pixel specified-bit detector 27 sets the number N to 2 and therefore designates and selects only the two lower bits among 8 bits per luminance pixel as bits into which a watermark fragment can be embedded as shown in FIG. 6. When the desired strength of an embedded watermark relative to an original picture is the third smallest, the pixel specified-bit detector 27 sets the number N to 3 and therefore designates and designates only the three lower bits among 8 bits per luminance pixel as bits into which a watermark fragment can be embedded as shown in FIG. 7.

In this way, the number of N lower bits among 8 bits per luminance pixel into which a watermark fragment can be embedded is increased as the desired strength of the embedded watermark relative to an original picture is greater. In fact, the actual strength of an embedded watermark relative to an original picture rises in accordance with an increase in the number of N lower bits among 8 bits per luminance pixel into which a corresponding fragment of the watermark has been embedded. The original picture is less deteriorated as the strength of the embedded watermark decreases. In the case where watermark-added contents data are compressed at a high rate by an application program, the strength of the embedded watermark is preferably set to such a great value as to prevent the watermark from being erased by the compression. Thus, the strength of the embedded watermark is decided in accordance with the application program.

Watermark information (information representing a watermark) has one bit per interested pixel. Accordingly, the watermark information is "0" or "1" for every interested pixel. The watermark information is also referred to as the watermark data. In the case where only the lowest bit is selected among 8 bits per luminance pixel as a bit into which a watermark fragment can be embedded as shown in FIG. 5, a watermark information bit of "0" or "1" corresponds to a lowest luminance pixel bit of "0" or "1". In the case where only the two lower bits are selected among 8 bits per luminance pixel as bits into which a watermark fragment can be embedded as shown in FIG. 6, a watermark information bit of "0" or "1" corresponds to two lower luminance pixel bits of "00" ("0" in decimal) or "11" ("3" in decimal). In the case where only the three lower bits are selected among 8 bits per luminance pixel as bits into which a watermark fragment can be embedded as shown in FIG. 7, a watermark information bit of "0" or "1" corresponds to three lower luminance pixel bits of "000" ("0" in decimal) or "111" ("7" in decimal). As previously mentioned, the actual strength of an embedded watermark relative to an original picture rises in accordance with an increase in the number of N lower bits among 8 bits per luminance pixel into which a corresponding fragment of the watermark has been embedded.

The pixel specified-bit detector 27 outputs the designated luminance pixel bits (the selected luminance pixel bits) to the exclusive-OR device 29. The exclusive-OR device 29 includes a calculator which computes a binary luminance pixel value from the designated luminance pixel bits. In the case where only the lowest bit is selected among 8 bits per luminance pixel as a bit into which a watermark fragment can be embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits into which a watermark fragment can be embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits into which a watermark fragment can be embedded, the calculator sets a luminance pixel value to "1" for three lower luminance pixel bits of "111" ("7" in decimal). The calculator sets a luminance pixel value to "0" for three lower luminance pixel bits different from "111". The exclusive-OR device 29 receives bits composing watermark information from the fixed-pattern generator 28. The exclusive-OR device 29 processes the luminance pixel values by calculation in response to the watermark information bits. The exclusive-OR device 29 outputs the processing-resultant luminance pixel values to the second sub-mixer 25.

For each of the watermark-embedding addresses notified by the embedding-position detector 22, the fixed-pattern generator 28 produces, for example, 9 bits in a fixed pattern which correspond to 9 neighboring pixels being 3 luminance pixels in a horizontal direction by 3 luminance pixels in a vertical direction. FIG. 8 shows an example of the fixed pattern of 9 bits (3 by 3 bits). Preferably, the fixed-pattern generator 28 includes a memory storing the fixed-pattern bits. The fixed-pattern generator 28 feeds the fixed-pattern bits to the exclusive-OR device 29 as watermark information bits. For other positions (addresses) in a frame, the fixed-pattern generator 28 does not feed the fixed-pattern bits to the exclusive-OR device 29 or outputs a signal of "0" to the exclusive-OR device 29. The fixed-pattern generator 28 notifies the exclusive-OR device 29 of the watermark-embedding addresses.

The exclusive-OR device 29 includes a memory storing 9 bits in a specified pattern which correspond to 9 neighboring pixels being 3 luminance pixels in a horizontal direction by 3 luminance pixels in a vertical direction. FIG. 9 shows an example of the specified pattern of 9 bits (3 by 3 bits). The exclusive-OR device 29 also includes a section for processing, in response to the watermark information bits, the luminance pixel values corresponding to the watermark-embedding addresses. Specifically, for each of the watermark-embedding addresses, the processing section of the exclusive-OR device 29 executes exclusive-OR operation between the watermark information bits (the fixed-pattern bits) and the specified-pattern bits on a bit-by-bit basis. The processing section forcedly sets or equalizes the corresponding luminance pixel values to the result of the exclusive-OR operation, for example, "111111111". The exclusive-OR device 29 outputs data representative of the processing-resultant luminance pixel values to the second sub-mixer 25. The exclusive-OR device 29 may notify the second sub-mixer 25 of the exclusive-OR operation result and the addresses of the related luminance pixel values.

In other words, the processing section of the exclusive-OR device 29 calculates a 9-bit pattern which can be converted into the specified bit pattern (see FIG. 9) by exclusive-OR operation with the fixed bit pattern (see FIG. 8). The processing section forcedly sets or equalizes the corresponding luminance pixel values to the calculated 9-bit pattern. An example of the calculated 9-bit pattern is "111111111". The exclusive-OR device 29 outputs data representative of the processing-resultant luminance pixel values (that is, the calculated 9-bit pattern) to the second sub-mixer 25.

The second sub-mixer 25 places the output data from the exclusive-OR device 29 in the corresponding luminance pixel bits of the conversion-resultant contents data (the data outputted from the color-difference-signal DC offset converter 21) which are designated and selected by the pixel specified-bit detector 27. In other words, the second sub-mixer 25 replaces the contents of the designated luminance pixel bits (the selected luminance pixel bits) with the contents of the output data from the exclusive-OR device 29. Thus, the second sub-mixer 25 rewrites or updates the designated luminance pixel bits into agreement with the output data from the exclusive-OR device 29. As a result, the calculated 9-bit pattern is embedded into each of portions of the conversion-resultant contents data which correspond to the watermark-embedding addresses. Basically, the second sub-mixer 25 does not change other bits of the conversion-resultant contents data. The second sub-mixer 25 combines the updating-resultant designated luminance pixel bits and the other bits of the conversion-resultant contents data into first watermarked contents data, that is, first watermark-added contents data.

The copyright information generator 14 produces a signal indicative of a copyright, for example, a copyright on the picture or pictures represented by the input contents data. The copyright information generator 14 outputs the produced signal to the second sub-mixer 25 as copyright information. The copyright information is composed of, for example, about 32 bits of a binary code which indicate the ASCII characters meaning the copyright or the ID number of a maker of the picture or pictures represented by the input contents data.

The second sub-mixer 25 embeds the DC-offset-value signal and the copyright information into the first watermark-added contents data in a suitable way selected from known ways. Information about the used embedding way is possessed by not only the encoding side (the recording side) but also a decoding side (a reproducing side). The embedding of the DC-offset-value signal and the copyright information converts the first watermark-added contents data into second watermark-added contents data (second watermarked contents data). The second sub-mixer 25 outputs the second watermark-added contents data to the MPEG encoder 15.

The MPEG encoder 15 compressively encodes the second watermark-added contents data into watermark-added MPEG contents data according to a known MPEG encoding procedure. The MPEG encoder 15 feeds the watermark-added MPEG contents data to the data writer 16. The data writer 16 changes the watermark-added MPEG contents data into corresponding data of a prescribed format suited for being recorded on a recording medium 17. The data writer 16 records the prescribed-record-format contents data on the recording medium 17.

As understood from FIGS. 8 and 9, the fixed bit pattern produced by the fixed-pattern generator 28, the specified bit pattern, and the embedded bit pattern remain unchanged when being rotated through 90, 180, or 270 degrees. Accordingly, even in the case where the first or second watermark-added contents data are processed by steps including a step of rotating the represented image through 90, 180, or 270 degrees, the watermark can be detected from the processing-resultant contents data.

Figure 10:
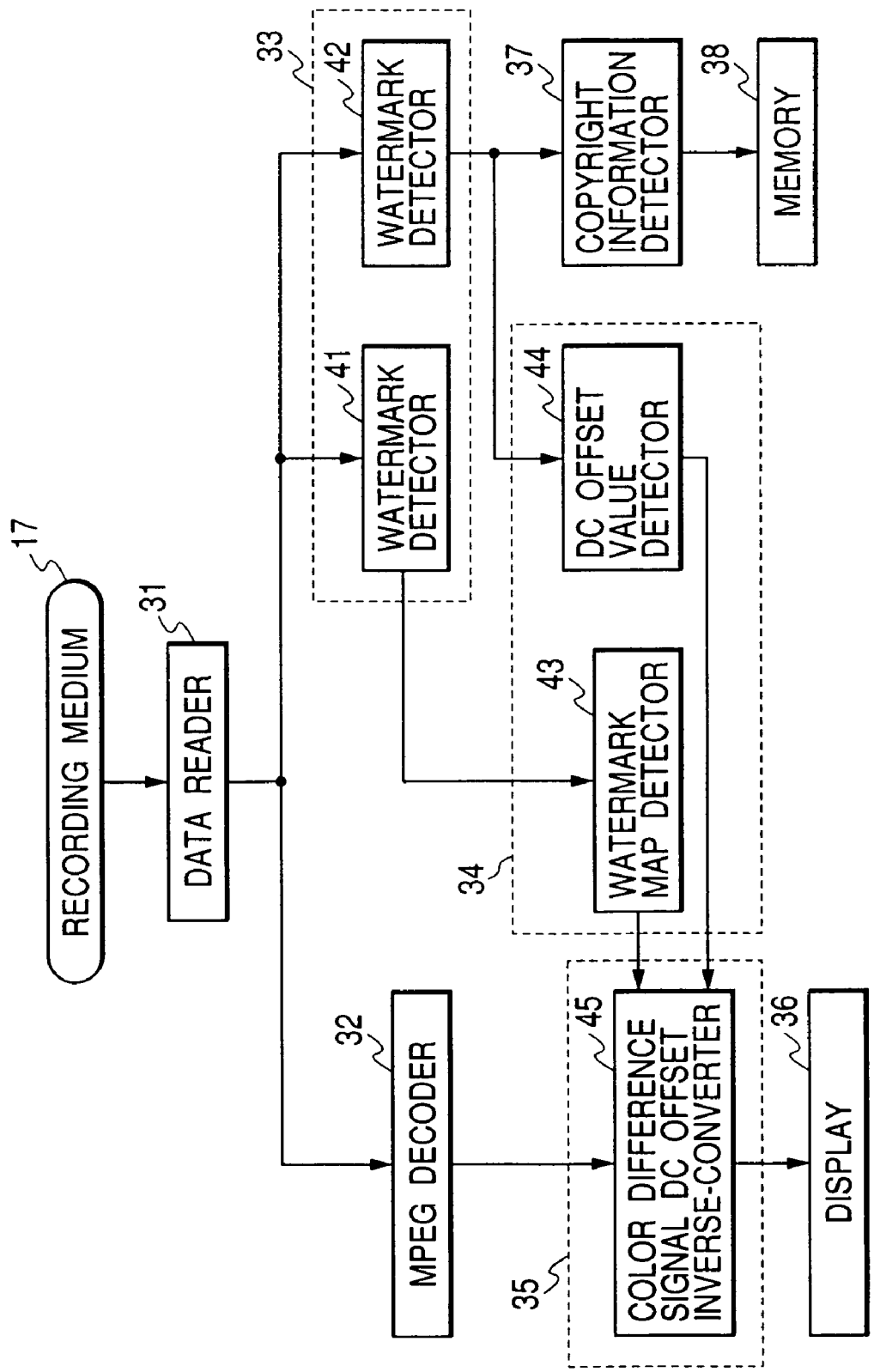
FIG. 10 is a block diagram of an apparatus for reproducing a watermark from watermarked contents data according to the first embodiment of this invention.

FIG. 10 shows an apparatus for reproducing or extracting a watermark from watermarked contents data (watermark-added contents data) according to the first embodiment of this invention. The apparatus of FIG. 10 includes a data reader 31, an MPEG decoder 32, a watermark detecting device 33, a parameter detecting device 34, a parameter inverse-converter 35, a display 36, a copyright information detector 37, and a memory 38. The data reader 31 is connected with the MPEG decoder 32 and the watermark detecting device 33. The MPEG decoder 32 is connected with the parameter inverse-converter 35. The watermark detecting device 33 is connected with the parameter detecting device 34 and the copyright information detector 37. The parameter detecting device 34 is connected with the parameter inverse-converter 35. The parameter inverse-converter 35 is connected with the display 36. The copyright information detector 37 is connected with the memory 38.

The watermark detecting device 33 has a first watermark detector 41 and a second watermark detector 42. The parameter detecting device 34 has a watermark map data detector 43 and a DC-offset-value detector 44. The parameter inverse-converter 35 has a color-difference-signal DC offset inverse-converter 45. The first watermark detector 41 is connected with the data reader 31 and the watermark map data detector 43. The second watermark detector 42 is connected with the data reader 31, the copyright information detector 37, and the DC-offset-value detector 44. The watermark map data detector 43 is connected with the color-difference-signal DC offset inverse-converter 45. The DC-offset-value detector 44 is connected with the color-difference-signal DC offset inverse-converter 45. The color-difference-signal DC offset inverse-converter 45 is connected with the MPEG decoder 32 and the display 36.

Figure 11:
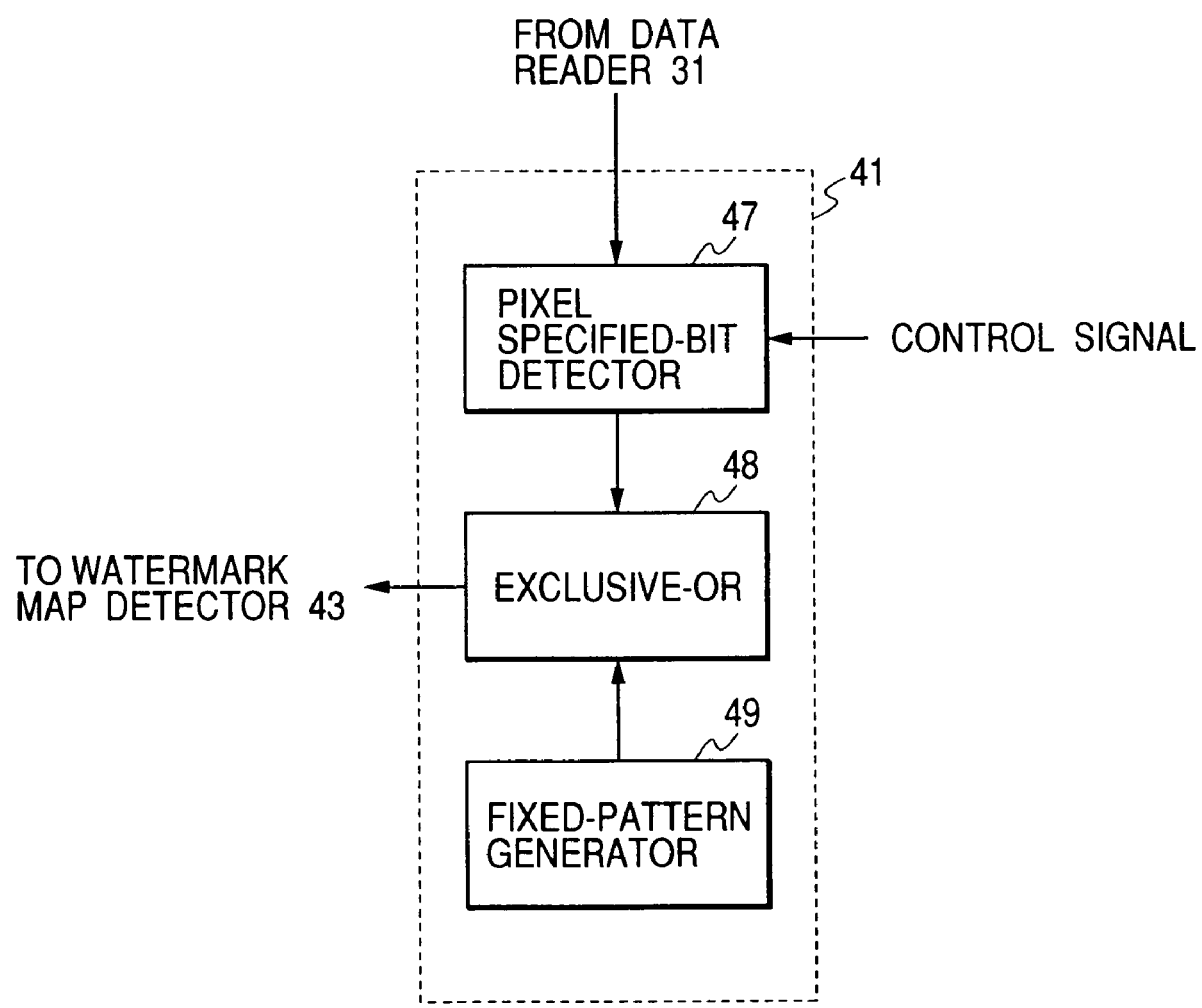
FIG. 11 is a block diagram of a watermark detector in FIG. 10.

As shown in FIG. 11, the first watermark detector 41 has a pixel specified-bit detector 47, an exclusive-OR device 48, a fixed-pattern generator 49. The pixel specified-bit detector 47 is connected with the data reader 31 (see FIG. 10) and the exclusive-OR device 48. The exclusive-OR device 48 is connected with the watermark map data detector 43 (see FIG. 10) and the fixed-pattern generator 49.

The data reader 31 accesses a recording medium 17 loaded with watermark-added contents data generated by, for example, the apparatus in FIG. 1. The data reader 31 reproduces the watermark-added contents data from the recording medium 17. The data reader 31 feeds the reproduced watermark-added contents data to the MPEG decoder 32, the pixel specified-bit detector 47, and the second watermark detector 42. The reproduced watermark-added contents data are composed of a watermark-added luminance signal Y and color difference signals Cb and Cr. Each of the watermark-added luminance signal Y and the color difference signals Cb and Cr has 8 bits per pixel.

The MPEG decoder 32 decodes the reproduced watermark-added contents data according to an MPEG decoding procedure. The MPEG decoder 32 outputs the decoding-resultant watermark-added contents data to the color-difference-signal DC offset inverse-converter 45.

For every pixel represented by the luminance signal Y in the reproduced watermark-added contents data, the pixel specified-bit detector 47 determines the number "N" of lower bits starting from the lowest bit among 8 bits corresponding to the pixel in accordance with the strength (intensity) of the embedded watermark relative to the original picture. Here, "N" denotes a natural number smaller than 8. A fragment of the watermark is embedded in the determined N lower bits. The pixel specified-bit detector 47 receives a control signal representing the strength of the embedded watermark. The control signal is fed from a suitable device such as an input device which can be accessed by a user.

Generally, the strength of the watermark embedded by the apparatus of FIG. 1 is previously known to the apparatus of FIG. 10 since the watermark strength is decided in accordance with the application program as previously mentioned. Preferably, a signal representing the strength of the embedded watermark is not transmitted together with the watermark-added contents data. Alternatively, a signal representing the strength of the embedded watermark may be included in the watermark-added contents data. According to a first example, the left-upper corner pixel in every frame represented by the watermark-added contents data is loaded with a signal representing the strength of the embedded watermark. According to a second example, a header of the watermark-added contents data is loaded with a signal representing the strength of the embedded watermark. In these cases, the signal representing the strength of the embedded watermark is transmitted together with the watermark-added contents data.

When the strength of the embedded watermark relative to the original picture is the smallest, the pixel specified-bit detector 47 sets the number N to 1 and therefore designates and selects only the lowest bit among 8 bits per luminance pixel as a bit in which a fragment of the watermark is embedded as shown in FIG. 5. When the strength of the embedded watermark relative to the original picture is the second smallest, the pixel specified-bit detector 47 sets the number N to 2 and therefore designates and selects only the two lower bits among 8 bits per luminance pixel as bits in which a fragment of the watermark is embedded as shown in FIG. 6. When the strength of the embedded watermark relative to the original picture is the third smallest, the pixel specified-bit detector 47 sets the number N to 3 and therefore designates and designates only the three lower bits among 8 bits per luminance pixel as bits in which a fragment of the watermark is embedded as shown in FIG. 7.

The pixel specified-bit detector 47 outputs the designated luminance pixel bits (the selected luminance pixel bits) to the exclusive-OR device 48. The exclusive-OR device 48 includes a calculator which computes a binary luminance pixel value from the designated luminance pixel bits. In the case where only the lowest bit is selected among 8 bits per luminance pixel as a bit in which a fragment of the watermark is embedded, the calculator sets a luminance pixel value to "0" for a designated luminance pixel bit of "0". The calculator sets a luminance pixel value to "1" for a designated luminance pixel bit of "1". In the case where only the two lower bits are selected among 8 bits per luminance pixel as bits in which a fragment of the watermark is embedded, the calculator sets a luminance pixel value to "1" for two lower luminance pixel bits of "11" ("3" in decimal). The calculator sets a luminance pixel value to "0" for two lower luminance pixel bits different from "11". In the case where only the three lower bits are selected among 8 bits per luminance pixel as bits in which a fragment of the watermark is embedded, the calculator sets a luminance pixel value to "1" for three lower luminance pixel bits of "111" ("7" in decimal). The calculator sets a luminance pixel value to "0" for three lower luminance pixel bits different from "111".

The fixed-pattern generator 49 includes a memory storing bits in a fixed pattern. The number of the fixed-pattern bits is equal to, for example, 9. The fixed bit pattern corresponds to, for example, 9 neighboring pixels being 3 luminance pixels in a horizontal direction by 3 luminance pixels in a vertical direction. The fixed bit pattern produced by the fixed-pattern generator 49 is the same as that produced by the fixed-pattern generator 28 in the apparatus of FIG. 1. For example, the fixed bit pattern produced by the fixed-pattern generator 49 is identical with that in FIG. 8. The fixed-pattern generator 49 outputs the bits in the fixed pattern to the exclusive-OR device 48.

For every 3 by 3 neighboring luminance pixels, the device 48 executes exclusive-OR operation between the luminance pixel values and the fixed-pattern bits on a bit-by-bit basis. The exclusive-OR device 48 outputs data representative of the results of exclusive-OR operation to the watermark map data detector 43.

The exclusive-OR device 48 includes a memory storing 9 bits in a specified pattern which correspond to 9 neighboring pixels being 3 luminance pixels in a horizontal direction by 3 luminance pixels in a vertical direction. The specified bit pattern is the same as that used in the apparatus of FIG. 1. For example, the specified bit pattern is identical with that in FIG. 9. The exclusive-OR device 48 further includes a deciding section (a comparing section). For every 3 by 3 neighboring luminance pixels, the deciding section determines whether or not the bit pattern represented by the operation-result data is equal to the specified bit pattern. When the bit pattern represented by the operation-result data is equal to the specified bit pattern, the deciding section determines that the operation-resultant data have a watermark fragment. In this case, the deciding section computes the position of 3 by 3 neighboring luminance pixels represented by the operation-resultant data. The computed position is defined relative to the frame. The computed position is referred as the watermark position. The deciding section notifies the watermark position to the watermark map data detector 43. On the other hand, when the bit pattern represented by the operation-result data is different from the specified bit pattern, the deciding section determines that the operation-resultant data do not have any watermark fragment. In this case, the deciding section does not implement the position computing step.

The watermark map data detector 43 generates a central address of a rectangular block of, for example, 9 neighboring luminance pixels (3 luminance pixels in a horizontal direction by 3 luminance pixels in a vertical direction) from each of the watermark positions notified by the exclusive-OR device 48. The rectangular blocks correspond to the prescribed blocks D representing the watermark, for example, "JVC" in FIG. 4. The rectangular blocks D are also referred to as the watermark blocks D. The watermark map data detector 43 notifies the generated watermark block addresses to the color-difference-signal DC offset inverse-converter 45.

The watermark map data detector 43 may include a memory storing font information representing the thicknesses and shapes of letters and characters. In this case, a reproduced watermark can be indicated as high-quality letters and characters on the display 36.

The second watermark detector 42 detects a DC-offset-value signal and copyright information in the reproduced watermark-added contents data. The second watermark detector 42 extracts the DC-offset-value signal and the copyright information from the reproduced watermark-added contents data. The second watermark detector 42 feeds the DC-offset-value signal to the DC-offset-value detector 44. The second watermark detector 42 feeds the copyright information to the copyright information detector 37.

The copyright information detector 37 decodes the copyright information. The copyright information detector 37 stores the decoding-resultant copyright information into the memory 38.

The DC-offset-value detector 44 recovers a DC offset value represented by the DC-offset-value signal. The DC-offset-value detector 44 notifies the recovered DC offset value to the color-difference-signal DC offset inverse-converter 45.

The color-difference-signal DC offset inverse-converter 45 receives the watermark-added contents data from the MPEG decoder 32. The color-difference-signal DC offset inverse-converter 45 processes only "red" components of the color difference signals in the watermark-added contents data which represent pixels in the watermark blocks having the addresses notified by the watermark map data detector 43. In other words, the color-difference-signal DC offset inverse-converter 45 processes only "red" components of the watermark-added contents data which correspond to the prescribed blocks D representing the watermark, "JVC". Specifically, the color-difference-signal DC offset inverse-converter 45 carries out DC-offset-value conversion inverse with respect to that implemented by the color-difference-signal DC offset converter 21 in the apparatus of FIG. 1. In more detail, the color-difference-signal DC offset inverse-converter 45 increases or decreases the DC values of the "red" signal components in accordance with the DC offset value notified by the DC-offset-value detector 44. For example, the DC values of the "red" signal components are decreased by about 17% to cancel the increases provided by the color-difference-signal DC offset converter 21 in the apparatus of FIG. 1. In this way, the "red" signal components corresponding to the prescribed blocks D are inversely converted into their original states. On the other hand, the color-difference-signal DC offset inverse-converter 45 does not process "blue" and "green" components of the color difference signals in the watermark-added contents data which represent pixels in the watermark blocks. The color-difference-signal DC offset inverse-converter 45 passes these unprocessed "blue" and "green" components of the color difference signals to the display 36. Also, the color-difference-signal DC offset inverse-converter 45 does not process the luminance signal in the watermark-added contents data which represent pixels in the watermark blocks. The color-difference-signal DC offset inverse-converter 45 passes the unprocessed luminance signal to the display 36. Furthermore, the color-difference-signal DC offset inverse-converter 45 does not process the watermark-added contents data which represent pixels outside the watermark blocks. The color-difference-signal DC offset inverse-converter 45 outputs the unprocessed watermark-added contents data to the display 36.

The display 36 indicates an image represented by the watermark-added contents data outputted from the color-difference-signal DC offset inverse-converter 45. Since the "red" components of the watermark-added contents data which correspond to the watermark blocks D have been returned to their original states by the color-difference-signal DC offset inverse-converter 45, the indicated image is identical with original one free from the watermark, "JVC".

In the event that the DC offset value fails to be recovered, the "red" components of the watermark-added contents data which correspond to the watermark blocks D can not be returned to their original states by the color-difference-signal DC offset inverse-converter 45. Thus, in this case, the "red" signal components having the 20%-increased DC values are passed to the display 36 as they are. As a result, in the image indicated by the display 36, pixels in the watermark blocks D are forcedly colored red while other pixels have original colors. Therefore, the watermark ("JVC") is displayed as red portions of the indicated image which form the foreground in the original picture.

In the case where illegal conduct intended to remove the watermark from the watermark-added contents data deletes the DC-offset-value signal therefrom, the DC offset value can not be recovered from the resultant contents data since the DC-offset-value signal is absent therefrom. Thus, in this case, when the resultant contents data are indicated by a display, the indicated image has a conspicuous red watermark which deteriorates the image quality. Accordingly, it is possible to protect the copyrighted contents data.

Second Embodiment

Figure 12:
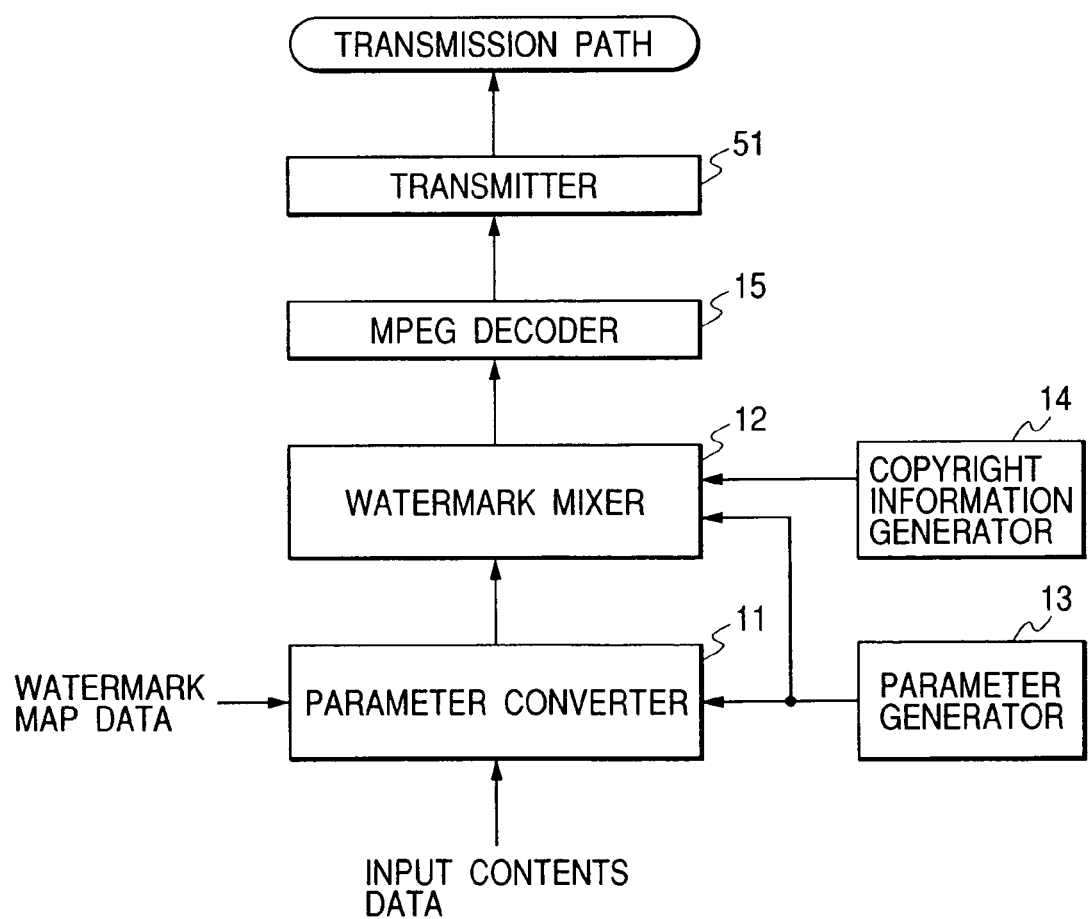
FIG. 12 is a block diagram of an apparatus for embedding a watermark into contents data according to a second embodiment of this invention.

FIG. 12 shows an apparatus for embedding or inserting a watermark into contents data according to a second embodiment of this invention. The apparatus of FIG. 12 is similar to the apparatus of FIG. 1 except for design changes mentioned hereafter.

The apparatus of FIG. 12 includes a transmitter 51 connected between the MPEG encoder 15 and a transmission path. The transmitter 51 receives the watermark-added MPEG contents data from the MPEG encoder 15. The transmitter 51 outputs the watermark-added MPEG contents data to the transmission path. The watermark-added MPEG contents data propagate along the transmission path. Preferably, the transmitter 51 implements format conversion of the watermark-added MPEG contents data before outputting the resultant data to the transmission path.

The transmission path includes a communication network such as a wire communication network, a radio communication network, or the Internet.

Figure 13:
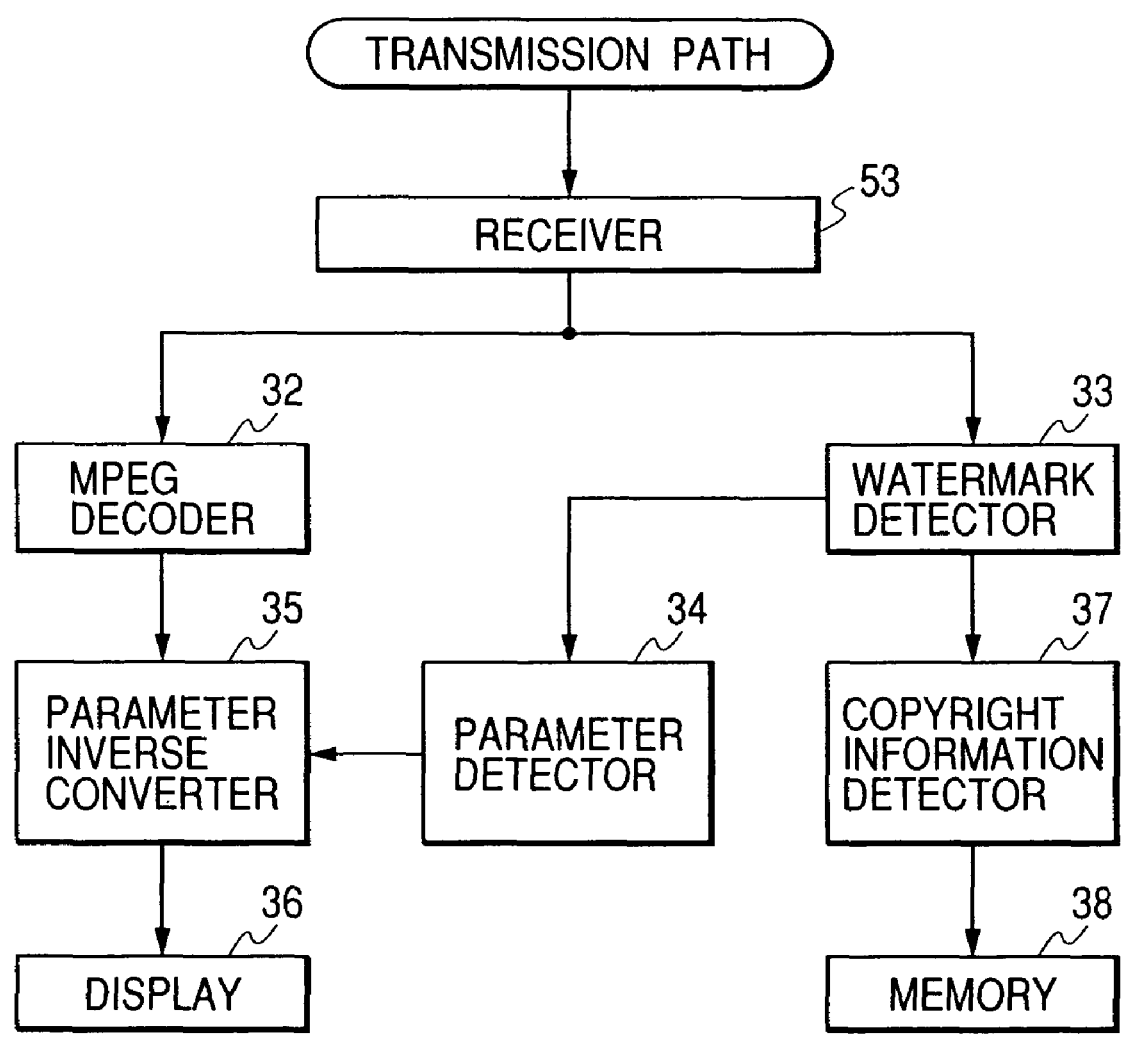
FIG. 13 is a block diagram of an apparatus for reproducing a watermark from watermarked contents data according to the second embodiment of this invention.

FIG. 13 shows an apparatus for reproducing or extracting a watermark from watermarked contents data (watermark-added contents data) according to the second embodiment of this invention. The apparatus of FIG. 13 is similar to the apparatus of FIG. 10 except for design changes mentioned hereafter.

The apparatus of FIG. 13 includes a receiver 53 connected to a transmission path, the MPEG decoder 32, and the watermark detecting device 33. The device 53 receives watermark-added contents data from the transmission path. Originally, the watermark-added contents data are transmitted by the apparatus of FIG. 12. The receiver 53 feeds the received watermark-added contents data to the MPEG decoder 32 and the watermark detecting device 33. Preferably, the receiver 53 implements format conversion of the received watermark-added contents data before outputting the resultant data to the MPEG decoder 32 and the watermark detecting device 33.

Third Embodiment

A third embodiment of this invention is similar to the first embodiment or the second embodiment thereof except for design changes mentioned hereafter.

In the third embodiment of this invention, the color-difference-signal DC offset converter 21 (see FIG. 1) processes only specified-color components of the color difference signals in the input contents data which represent pixels at the watermark-embedding addresses notified by the embedding-position detector 22. The specified color differs from "red".

In the third embodiment of this invention, the color-difference-signal DC offset inverse-converter 45 (see FIG. 10) processes only specified-color components of the color difference signals in the watermark-added contents data which represent pixels in the watermark blocks having the addresses notified by the watermark map data detector 43. The specified color differs from "red".

Fourth Embodiment

A fourth embodiment of this invention is similar to the first embodiment or the second embodiment thereof except for design changes mentioned hereafter.

In the fourth embodiment of this invention, the parameter converter 11 (see FIG. 1) processes only segments of the luminance signal in the input contents data which represent pixels at the watermark-embedding addresses.

In the fourth embodiment of this invention, the parameter inverse-converter 35 (see FIG. 10) processes only segments of the luminance signal in the watermark-added contents data which represent pixels in the watermark blocks.

Fifth Embodiment

A fifth embodiment of this invention is similar to the first embodiment or the second embodiment thereof except for design changes mentioned hereafter. The fifth embodiment of this invention implements parameter conversion such as DC-offset-value conversion, color-space matrix conversion, or data-sample exchange conversion.

The DC-offset-value conversion is designed so that Cb data or Cr data are reduced by 20%. In the case where the conversion-resultant contents data are indicated on a display without being subjected to inverse conversion, the whole of the indicated image is tinged with red or blue. Thus, in this case, the quality of the indicated image is low.

Two parameters may be set in Cb data or Cr data. Conversion is implemented about the two parameters. In this case, the parameter conversion is applied to both two color spaces (blue and red spaces). The parameter conversion may be based on a prescribed function such as "$Y = a \cdot X + b$", where "X" denotes original Cb or Cr data, and "a" and "b" denote parameters. In this case, for one value, an 8-bit information piece is embedded as a fragment of a watermark.

A luminance signal Y, a color difference signal Cb, and a color difference signal Cr define three color spaces to be compressively encoded. The three color spaces may be converted into other color spaces by prescribed calculative operation with respect to matrices each having 3 rows and 3 columns. In this case, 9 parameters are used and transmitted as watermark information. The 9 parameters are 9 matrix elements (9 matrix coefficients) which may be represented by 9 bits. Alternatively, 8 different types of matrices may be predetermined. In this case, a 3-bit signal representing the type of each matrix is transmitted.

Data samples may be converted on a pixel-by-pixel basis. For example, regarding a sequence of 1-pixel-corresponding Cb and Cr data pieces in a raster scanning order, Cb and Cr data pieces corresponding to each of even-numbered pixels are exchanged. In a same color space, odd-numbered data pieces and even-numbered data pieces may be exchanged. Preferably, a parameter which can uniquely designate rules of the exchange is decided in both an encoding side and a decoding side (a recording side and a reproducing side). In this case, information about the parameter is transmitted, and inverse conversion is executed in response to the transmitted parameter. When the information about the parameter fails to be transmitted, the quality of an indicated image (a reproduced image) is low.

In the case of contents data representing a picture or pictures, parameter conversion may be designed so that figures and characters having a given visual meaning will be included in an image represented by reproduced data occurring before inverse conversion. In this case, DC-value-offset conversion or color-space matrix conversion in the inverse conversion results in erasure of the figures and characters. Preferably, information about the positions of the figures and characters relative to a frame is transmitted in such a manner that a user can hardly perform detection thereof. For example, the information about the positions of the figures and characters is transmitted as a watermark pattern.

Sixth Embodiment

Figure 14:
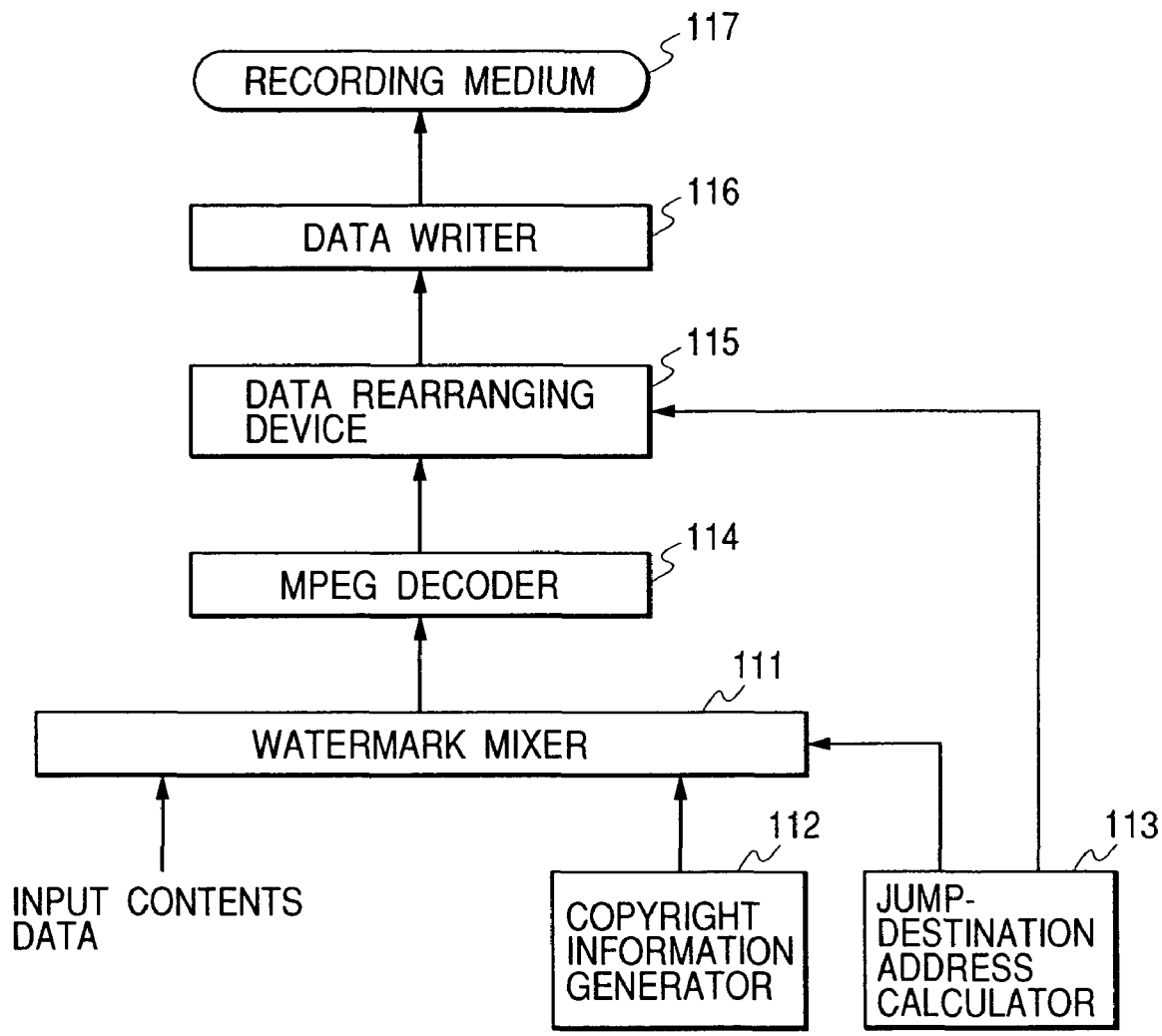
FIG. 14 is a block diagram of an apparatus for embedding a watermark into contents data according to a sixth embodiment of this invention.

FIG. 14 shows an apparatus for embedding or inserting a watermark into contents data according to a sixth embodiment of this invention. The apparatus of FIG. 14 includes a watermark mixer 111, a copyright information generator 112, a jump-destination address generator 113, an MPEG encoder 114, a data rearranging device 115, and a data writer 116.

The watermark mixer 111 is connected with the copyright information generator 112, the jump-destination address generator 113, and the MPEG encoder 114. The jump-destination address generator 113 is connected with the data rearranging device 115. The MPEG encoder 114 is connected with the data rearranging device 115. The data rearranging device 115 is connected with the data writer 116.

Input contents data representing an original picture or a sequence of original pictures are fed to the watermark mixer 111. The input contents data may additionally include audio information.

The copyright information generator 112 produces a signal indicative of a copyright, for example, a copyright on the picture or pictures represented by the input contents data. The copyright information generator 112 feeds the produced signal to the watermark mixer 111 as copyright information. The copyright information is composed of, for example, about 32 bits of a binary code which indicate the ASCII characters meaning the copyright or the ID number of a maker of the picture or pictures represented by the input contents data.

MPEG-encoded contents data are divided into unit segments called "cells". The jump-destination address generator 113 produces a jump-destination address for each cell. According to the produced jump-destination addresses, cells are rearranged in an order different from an original playback order (a normal playback order). The jump-destination address generator 113 converts every jump-designation address into a 3-bit code word, and feeds the 3-bit code word to the watermark mixer 111 and the data rearranging device 115.

The copyright information and the jump-destination address (the 3-bit code word) fed to the watermark mixer 111 compose watermark information. The watermark mixer 111 embeds or inserts the watermark information into the input contents data to get watermarked contents data or watermark-added contents data. The watermark mixer 111 outputs the watermark-added contents data to the MPEG encoder 114.

The MPEG encoder 114 compressively encodes the watermark-added contents data into watermark-added MPEG contents data according to a known MPEG encoding procedure. The MPEG encoder 114 feeds the watermark-added MPEG contents data to the data rearranging device 115.

As previously mentioned, the jump-destination address generator 113 notifies the data rearranging device 115 of a jump-designation address for each cell of the watermark-added MPEG contents data. The data rearranging device 115 rearranges the cells of the watermark-added MPEG contents data in an order being different from the original playback order and being determined by the jump-destination addresses. The data rearranging device 115 outputs the cells of the watermark-added MPEG contents data to the data writer 116 in the rearranging-resultant order. Thus, the data rearranging device 115 converts the watermark-added MPEG contents data into second watermark-added MPEG contents data. The data rearranging device 115 outputs the second watermark-added MPEG contents data to the data writer 116. The data writer 116 changes the second watermark-added MPEG contents data into corresponding data of a prescribed format suited for being recorded on a recording medium 117. The data writer 116 records the prescribed-record-format contents data on the recording medium 117.

The sixth embodiment of this invention will be further described below. Pieces of contents data are rearranged in an order different from an original playback order on a unit-by-unit basis (for example, a cell-by-cell basis) before being recorded on a recording medium. Jump-destination addresses relating to the data-piece rearrangement are embedded or inserted into the contents data as fragments of watermark information. For example, each cell is additionally provided with a jump-destination address (a 3-bit code word) representing the position of the head of a next cell which should follow the present cell in the original playback order. During playback, jump-destination addresses are reproduced, and jumps between cells are executed in response to the reproduced jump-destination addresses to provide a cell sequence accorded with the original playback order.

A recording medium stores contents data including video information which results from MPEG-based data compression. According to the MPEG-based data compression, a motion compensator generates data representing a decoding-resultant picture. An error between data representing an input picture and the data representing the decoding-resultant picture is calculated. Therefore, temporally-redundant portions of the input-picture data are reduced or deleted. The MPEG-based data compression implements prediction in a direction from the past, prediction in a direction from the future, or prediction in both a direction from the past and a direction from the future. The implemented prediction is changed on an MB-by-MB basis, where MB denotes a macro-block of picture data which corresponds to 16 pixels by 16 pixels. The direction of the implemented prediction is decided by the type of an input picture. Encoding data representative of a P picture is changed between first and second modes. According to the first mode, macro-blocks of the P-picture data are encoded by using the prediction in the direction from the past. According to the second mode, macro-blocks of the P-picture data are independently encoded without using any prediction. Encoding data representative of a B picture is changed among first, second, third, and fourth modes. According to the first mode, macro-blocks of the B-picture data are encoded by using the prediction in the direction from the future. According to the second mode, macro-blocks of the B-picture data are encoded by using the prediction in the direction from the past. According to the third mode, macro-blocks of the B-picture data are encoded by using the prediction in both the direction from the future and the direction from the past. According to the fourth mode, macro-blocks of the B-picture data are independently encoded without using any prediction. Macro-blocks of data representative of an I picture are independently encoded without using any prediction.

Motion compensation implements pattern matching between two successive pictures on an MB-by-MB basis, thereby detecting motion vectors having an accuracy corresponding to a half pel (a half pixel). Shifts of picture segments are executed, and prediction is implemented on the basis of the shift-resultant picture segments. Motion vectors are in a horizontal direction and a vertical direction. There is an MC-mode signal (a motion-compensation-mode signal) indicating the starting position for the prediction. Motion vectors and an MC-mode signal are transmitted as added information related to every macro-block. Successive pictures starting from an I picture to a picture immediately-preceding a next I picture are referred to as a group of pictures (GOP). In general, one GOP is composed of about 15 pictures. Compression-resultant data are divided into unit portions of a common logical structure in which video data representative of one GOP and audio data corresponding to the playback time of the video data are multiplexed with each other. A unit portion of the compression-resultant data is referred to as a cell.

Figure 15:
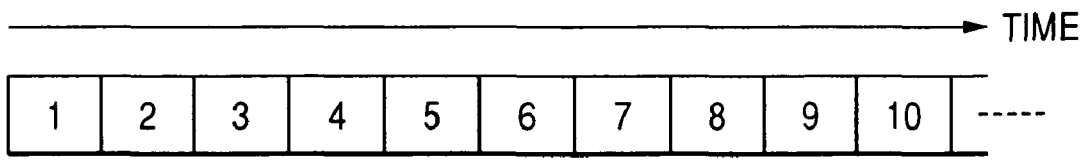
FIG. 15 is a time-domain diagram of a sequence of cells in an original playback order.
Figure 16:
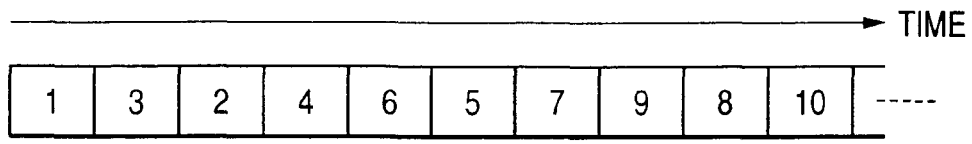
FIG. 16 is a time-domain diagram of a first sequence of cells in an order different from an original playback order.
Figure 17:
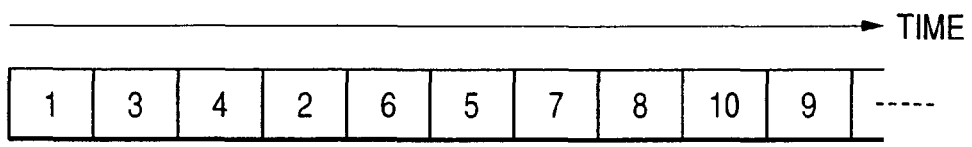
FIG. 17 is a time-domain diagram of a second sequence of cells in an order different from an original playback order.

Cells are reproduced in an original playback order as shown in FIG. 15 so that a program represented by the cells is continuously played back. Cells are rearranged in an order different from the original playback order before being recorded. As a result, the program represented by the cells is scrambled. FIG. 16 shows a first example of the rearranging-resultant order which is caused by jumping some cells to previous positions or later positions. FIG. 17 shows a second example of the rearranging-resultant order which is caused by jumping some cells to previous positions or later positions.

A jump-destination address is represented by a word of a 3-bit code for each cell. Every 3-bit code word indicates the type of a jump by which a related cell can be returned to its correct position in an original playback order. Specifically, a jump-destination-address code word of "000" indicates that a jump is unnecessary. A jump-destination-address code word of "001" indicates a jump over one cell in the forward direction. A jump-destination-address code word of "010" indicates a jump over two cells in the forward direction. A jump-destination-address code word of "011" indicates a jump over three cells in the forward direction. A jump-destination-address code word of "100" indicates a jump over one cell in the backward direction. A jump-destination-address code word of "101" indicates a jump over two cells in the backward direction. A jump-destination-address code word of "110" indicates a jump over three cells in the backward direction. A jump-destination-address code word of "111" indicates a jump over four cells in the backward direction.

In the case where a jump-destination-address code word of "000" is detected during playback, a jump from a related cell is inhibited. When a jump-destination-address code word of "001" is detected, a jump from a related cell over one cell in the forward direction is executed. When a jump-destination-address code word of "100" is detected, a jump from a related cell over one cell in the backward direction is executed. When a jump-destination-address code word of "111" is detected, a jump from a related cell over four cells in the backward direction is executed.

Regarding the rearranging-resultant order in FIG. 16, a jump-destination-address code word of "001" is added to the end of the first cell (the leftmost cell). A jump-destination-address code word of "101" is added to the end of the second cell.

Regarding the rearranging-resultant order in FIG. 17, a jump-destination-address code word of "010" is added to the end of the first cell (the leftmost cell). A jump-destination-address code word of "110" is added to the end of the second cell.

As previously mentioned, the jump-destination-address code words are embedded or inserted into the cells of the contents data as the fragments of the watermark information respectively.

Figure 18:
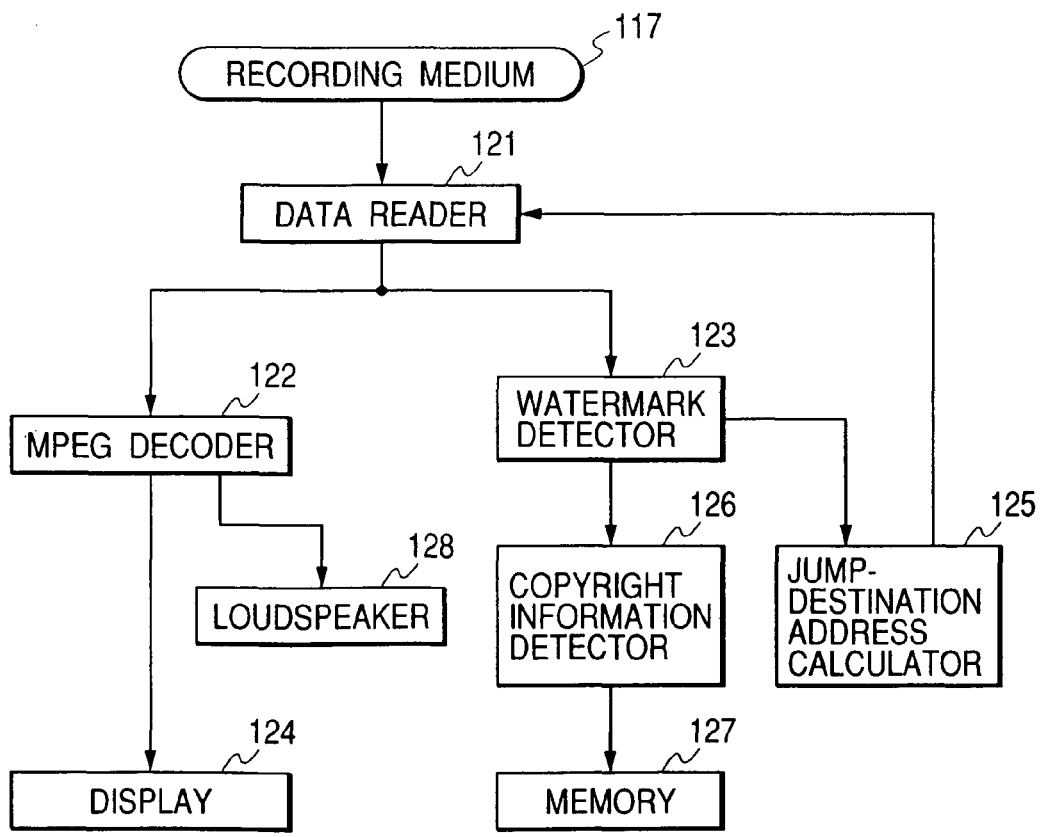
FIG. 18 is a block diagram of an apparatus for reproducing a watermark from watermarked contents data according to the sixth embodiment of this invention.

FIG. 18 shows an apparatus for reproducing or extracting a watermark from watermarked contents data (watermark-added contents data) according to the sixth embodiment of this invention. The apparatus of FIG. 18 includes a data reader 121, an MPEG decoder 122, a watermark detecting device 123, a display 124, a jump-destination address calculator 125, a copyright information detector 126, a memory 127, and a loudspeaker 128.

The data reader 121 is connected with the MPEG decoder 122, the watermark detecting device 123, and the jump-destination address calculator 125. The MPEG decoder 122 is connected with the display 124 and the loudspeaker 128. The watermark detecting device 123 is connected with the jump-destination address calculator 125 and the copyright information detector 126. The copyright information detector 126 is connected with the memory 127.

A recording medium 117 stores watermark-added contents data originally generated by, for example, the apparatus of FIG. 14. The stored watermark-added contents data have cells arranged in an order different from an original playback order. The stored watermark-added contents data include a set of audio information and video information placed in the cells. The stored watermark-added contents data also include a jump-destination-address code word for every cell which indicates the type of a jump by which the related cell can be returned to its correct position in the original playback order. The stored watermark-added contents data further include copyright information. The jump-destination-address code words and the copyright information compose watermark information.

At an initial stage of operation of the apparatus in FIG. 18, the data reader 121 reads out the first cell of the watermark-added contents data from the recording medium 117. The data reader 121 feeds the first cell of the watermark-added contents data to the MPEG decoder 122 and the watermark detecting device 123. The MPEG decoder 122 subjects the first cell of the watermark-added contents data to an MPEG decoding procedure, thereby reproducing a video signal and an audio signal. The MPEG decoder 122 feeds the reproduced video signal to the display 124. The reproduced video signal is indicated on the display 124. Preferably, the watermark information is designed to be substantially invisible when being indicated on the display 124. The MPEG decoder 122 feeds the reproduced audio signal to the loudspeaker 128. The reproduced audio signal is converted into corresponding sounds by the loudspeaker 128. On the other hand, the watermark detecting device 123 extracts the watermark information from the first cell of the watermark-added contents data. The extracted watermark information includes the jump-destination-address code word relating to the first cell. The watermark detecting device 123 feeds the jump-destination-address code word to the jump-destination address calculator 125. The jump-destination address calculator 125 computes a jump-destination address from the jump-destination-address code word. The jump-designation address denotes the position to which the currently-accessed point on the recording medium 117 should be jumped, that is, the position of the head of a cell to be accessed next. The jump-destination address calculator 125 notifies the data reader 121 of the computed jump-destination address. After the read-out of the first cell of the watermark-added contents data from the recording medium 117 has been completed, the data reader 121 jumps the currently-accessed point on the recording medium 117 to the position denoted by the jump-destination address and then starts reading out the second cell of the watermark-added contents data from the recording medium 117.

Similarly, the data reader 121 reads out the second and later cells of the watermark-added contents data from the recording medium 117. The data reader 121 feeds the second and later cells of the watermark-added contents data to the MPEG decoder 122 and the watermark detecting device 123. The MPEG decoder 122 subjects the second and later cells of the watermark-added contents data to an MPEG decoding procedure, thereby reproducing a video signal and an audio signal. The MPEG decoder 122 feeds the reproduced video signal to the display 124. The reproduced video signal is indicated on the display 124. The MPEG decoder 122 feeds the reproduced audio signal to the loudspeaker 128. The reproduced audio signal is converted into corresponding sounds by the loudspeaker 128. On the other hand, the watermark detecting device 123 extracts the watermark information from the second and later cells of the watermark-added contents data. The extracted watermark information includes the jump-destination-address code words relating to the second and later cells. The watermark detecting device 123 feeds the jump-destination-address code words to the jump-destination address calculator 125. The jump-destination address calculator 125 computes a jump-destination address from each of the jump-destination-address code words. The jump-designation address denotes the position to which the currently-accessed point on the recording medium 117 should be jumped, that is, the position of the head of a cell to be accessed next. The jump-destination address calculator 125 notifies the data reader 121 of the computed jump-destination addresses. After the read-out of the current cell of the watermark-added contents data from the recording medium 117 has been completed, the data reader 121 jumps the currently-accessed point on the recording medium 117 to the position denoted by the jump-destination address and then starts reading out the next cell of the watermark-added contents data from the recording medium 117.

As understood from the previous description, the currently-accessed point on the recording medium 117 is jumped or non-jumped in response to each of the jump-destination-address code words. The jumps of the currently-accessed point in response to the jump-destination-address code words enable the cells of the watermark-added contents data to be sequentially reproduced in the original playback order.

The watermark information extracted by the watermark detecting device 123 includes the copyright information. The watermark detecting device 123 feeds the copyright information to the copyright information detector 126. The copyright information detector 126 decodes the copyright information. The copyright information detector 126 stores the decoding-resultant copyright information into the memory 127. As previously mentioned, the watermark information extracted by the watermark detecting device 123 includes the jump-destination-address code words. The watermark detecting device 123 may store the jump-destination-address code words into the memory 127.

As understood from the previous description, when the jump-destination-address code words fail to be recovered, it is difficult to reproduce the cells of the watermark-added contents data in the normal playback order (the original playback order). In the event that illegal conduct removes the watermark information from the watermark-added contents data, the jump-destination-address code words in the watermark information are also lost. Thus, in this case, the cells of the watermark-added contents data can not be reproduced in the normal playback order. Accordingly, the watermark-added contents data are protected from illegal playback.

Seventh Embodiment

A seventh embodiment of this invention is similar to the sixth embodiment thereof except for design changes mentioned hereafter. In the seventh embodiment of this invention, every frame (for example, every still-picture frame) represented by watermark-added contents data is divided into 4-by-4 sub-regions, that is, 16 sub-regions as shown in FIG. 19. For every frame, the watermark-added contents data are divided into unit segments called "blocks" corresponding to the 16 sub-regions respectively. For every frame, the blocks of the watermark-added contents data are arranged in a raster scanning order as shown in FIG. 19.

In the seventh embodiment of this invention, the jump-destination address generator 113 (see FIG. 14) produces a jump-destination address for each block. According to the produced jump-destination addresses, blocks are rearranged in an order different from the raster scanning order. The jump-destination address generator 113 converts every jump-designation address into a 3-bit code word, and feeds the 3-bit code word to the watermark mixer 111 and the data rearranging device 115 (see FIG. 14).

The copyright information and the jump-destination address (the 3-bit code word) fed to the watermark mixer 111 compose watermark information. The watermark mixer 111 embeds or inserts the watermark information into the input contents data to get watermarked contents data, that is, watermark-added contents data. The watermark mixer 111 outputs the watermark-added contents data to the MPEG encoder 114 (see FIG. 14). The watermark mixer 111 may directly output the watermark-added contents data to the data rearranging device 115. In this case, the MPEG encoder 114 is omitted.

The MPEG encoder 114 compressively encodes the watermark-added contents data into watermark-added MPEG contents data according to a known MPEG encoding procedure. The MPEG encoder 114 outputs the watermark-added MPEG contents data to the data rearranging device 115 (see FIG. 14).

The jump-destination address generator 113 notifies the data rearranging device 115 of a jump-designation address for each block of the watermark-added contents data outputted from the watermark mixer 111 or the MPEG encoder 114. The data rearranging device 115 rearranges the blocks of the watermark-added contents data from the watermark mixer 111 or the MPEG encoder 114 in an order being different from the raster scanning order and being determined by the jump-destination addresses. The data rearranging device 115 outputs the blocks of the watermark-added contents data to the data writer 116 (see FIG. 14) in the rearranging-resultant order. Thus, the data rearranging device 115 converts the watermark-added contents data into second watermark-added contents data. The data rearranging device 115 outputs the second watermark-added contents data to the data writer 116. The data writer 116 changes the second watermark-added contents data into corresponding data of a prescribed format suited for being recorded on a recording medium 117 (see FIG. 17). The data writer 116 records the prescribed-record-format contents data on the recording medium 117.

The seventh embodiment of this invention will be further described below. Pieces of contents data for every frame are rearranged in an order different from a raster scanning order on a unit-by-unit basis (for example, a block-by-block basis) before being recorded on a recording medium. Jump-destination addresses relating to the data-piece rearrangement are embedded or inserted into the contents data as fragments of watermark information. For example, each block is additionally provided with a jump-destination address (a 3-bit code word) representing the position of the head of a next block which should follow the present block in the raster scanning order. During playback, jump-destination addresses are reproduced, and jumps between blocks are executed in response to the reproduced jump-destination addresses to provide a block sequence accorded with the raster scanning order.

Blocks are reproduced in the raster scanning order as shown in FIG. 19 so that every 1-frame picture represented by the blocks is normally reproduced. Blocks are rearranged in an order different from the raster scanning order before being recorded. As a result, the 1-frame picture represented by the blocks is scrambled. FIG. 20 shows an example of the rearranging-resultant order which is caused by jumping some blocks to previous positions or later positions for a frame. The jump-based block rearrangement keeps prescribed rules as follows. For every frame, blocks corresponding to two upper lines of sub-regions compose a first slice, and also blocks corresponding to two lower lines of sub-regions compose a second slice which follows the first slice in the raster scanning order. Slices are arranged in a fixed order. Any block jump between different slices is inhibited. Only block jumps in a same slice are permitted. The first block in every slice remains corresponding to the leftmost upper sub-region. Accordingly, the last block in every slice is followed by the block in a next slice which corresponds to the leftmost upper sub-region.

A jump-destination address is represented by a word of a 3-bit code for each block. Every 3-bit code word indicates the type of a jump by which a related block can be returned to its correct position in the raster scanning order. Specifically, a jump-destination-address code word of "000" indicates a jump by one block in the rightward direction plus a jump by one block in the upward direction. Here, the directions are defined with respect to corresponding sub-regions in a frame. A jump-destination-address code word of "001" indicates a jump by one block in the rightward direction. A jump-destination-address code word of "010" indicates a jump by one block in the rightward direction plus a jump by one block in the downward direction. A jump-destination-address code word of "011" indicates a jump by one block in the upward direction. A jump-destination-address code word of "100" indicates a jump by one block in the downward direction. A jump-destination-address code word of "101" indicates a jump by one block in the leftward direction plus a jump by one block in the downward direction. A jump-destination-address code word of "110" indicates a jump by one block in the leftward direction. A jump-destination-address code word of "111" indicates a jump by one block in the leftward direction plus a jump by one block in the upward direction.

Regarding the rearranging-resultant order in FIG. 20, for every frame, a jump-destination-address code word of "010" is added to the end of the first block. A jump-destination-address code word of "110" is added to the end of the second block. A jump-destination-address code word of "000" is added to the end of the third block. A jump-destination-address code word of "001" is added to the end of the fourth block. A jump-destination-address code word of "100" is added to the end of the fifth block. A jump-destination-address code word of "001" is added to the end of the sixth block. A jump-destination-address code word of "001" is added to the end of the seventh block. No jump-destination-address code word is added to the end of the eighth block. The first to eighth blocks compose a slice. A next slice starts from the ninth block. A jump-destination-address code word of "001" is added to the end of the ninth block. A jump-destination-address code word of "101" is added to the end of the tenth block. A jump-destination-address code word of "001" is added to the end of the eleventh block. A jump-destination-address code word of "000" is added to the end of the twelfth block. A jump-destination-address code word of "100" is added to the end of the thirteenth block. A jump-destination-address code word of "000" is added to the end of the fourteenth block. A jump-destination-address code word of "100" is added to the end of the fifteenth block. No jump-destination-address code word is added to the end of the sixteenth block.

In the seventh embodiment of this invention, watermark-added contents data stored in a recording medium 117 (see FIG. 18) have blocks arranged in an order different from a raster scanning order. The stored watermark-added contents data include a set of audio information and video information placed in the blocks. Alternatively, the stored watermark-added contents data may include video information (for example, still-picture information) placed in the blocks. The stored watermark-added contents data also include a jump-destination-address code word for every block which indicates the type of a jump by which the related block can be returned to its correct position in the raster scanning order. The stored watermark-added contents data further include copyright information. The jump-destination-address code words and the copyright information compose watermark information.

At an initial stage of 1-frame reproduction of the watermark-added contents data from the recording medium 117, the data reader 121 (see FIG. 18) reads out the first block of the watermark-added contents data from the recording medium 117. The data reader 121 feeds the first block of the watermark-added contents data to the MPEG decoder 122 and the watermark detecting device 123 (see FIG. 18). The data reader 121 may directly feed the first block of the watermark-added contents data to the display 124 (see FIG. 18). In this case, the MPEG decoder 122 is omitted. The watermark detecting device 123 extracts the watermark information from the first block of the watermark-added contents data. The extracted watermark information includes the jump-destination-address code word relating to the first block. The watermark detecting device 123 feeds the jump-destination-address code word to the jump-destination address calculator 125 (see FIG. 18). The jump-destination address calculator 125 computes a jump-destination address from the jump-destination-address code word. The jump-designation address denotes the position to which the currently-accessed point on the recording medium 117 should be jumped, that is, the position of the head of a block to be accessed next. The jump-destination address calculator 125 notifies the data reader 121 of the computed jump-destination address. After the read-out of the first block of the watermark-added contents data from the recording medium 117 has been completed, the data reader 121 jumps the currently-accessed point on the recording medium 117 to the position denoted by the jump-destination address and then starts reading out the second block of the watermark-added contents data from the recording medium 117.

Similarly, the data reader 121 reads out the second and later blocks of the watermark-added contents data from the recording medium 117. The data reader 121 feeds the second and later blocks of the watermark-added contents data to the MPEG decoder 122 and the watermark detecting device 123. In the absence of the MPEG decoder 122, the data reader 121 directly feeds the second and later blocks of the watermark-added contents data to the display 124. The watermark detecting device 123 extracts the watermark information from the second and later blocks of the watermark-added contents data. The extracted watermark information includes the jump-destination-address code words relating to the second and later blocks. The watermark detecting device 123 feeds the jump-destination-address code words to the jump-destination address calculator 125. The jump-destination address calculator 125 computes a jump-destination address from each of the jump-destination-address code words. The jump-designation address denotes the position to which the currently-accessed point on the recording medium 117 should be jumped, that is, the position of the head of a block to be accessed next. The jump-destination address calculator 125 notifies the data reader 121 of the computed jump-destination addresses. After the read-out of the current block of the watermark-added contents data from the recording medium 117 has been completed, the data reader 121 jumps the currently-accessed point on the recording medium 117 to the position denoted by the jump-destination address and then starts reading out the next block of the watermark-added contents data from the recording medium 117.

The MPEG decoder 122 receives the blocks of the watermark-added contents data from the data reader 121. The MPEG decoder 122 subjects the watermark-added contents data to an MPEG decoding procedure, thereby reproducing a video signal and an audio signal. The MPEG decoder 122 feeds the reproduced video signal to the display 124 (see FIG. 18). The reproduced video signal is indicated on the display 124. The MPEG decoder 122 feeds the reproduced audio signal to the loudspeaker 128 (see FIG. 18). The reproduced audio signal is converted into corresponding sounds by the loudspeaker 128.

In the absence of the MPEG decoder 122, the display 124 directly receives the blocks of the watermark-added contents data from the data reader 121. The display 124 indicates a picture or pictures (for example, a still picture or still pictures) represented by the blocks of the watermark-added contents data.

As understood from the previous description, the currently-accessed point on the recording medium 117 is jumped in response to each of the jump-destination-address code words. The jumps of the currently-accessed point in response to the jump-destination-address code words enable the blocks of the watermark-added contents data to be sequentially reproduced in the raster scanning order.

When the jump-destination-address code words fail to be recovered, it is difficult to reproduce the blocks of the watermark-added contents data in the raster scanning order. In the event that illegal conduct removes the watermark information from the watermark-added contents data, the jump-destination-address code words in the watermark information are also lost. Thus, in this case, the blocks of the watermark-added contents data can not be reproduced in the raster scanning order. Accordingly, the watermark-added contents data are protected from illegal reproduction.

Eighth Embodiment

An eighth embodiment of this invention is similar to the sixth embodiment thereof except for design changes mentioned hereafter. In the eighth embodiment of this invention, every frame (for example, every still-picture frame) represented by watermark-added contents data is divided into 12 sub-regions as shown in FIG. 21. For every frame, the watermark-added contents data are divided into unit segments called "slices" corresponding to the 12 sub-regions respectively. For every frame, the slices of the watermark-added contents data are arranged in a raster scanning order as shown in FIG. 21.

In the eighth embodiment of this invention, the jump-destination address generator 113 (see FIG. 14) produces a jump-destination address for each slice. According to the produced jump-destination addresses, slices are rearranged in an order different from the raster scanning order. The jump-destination address generator 113 converts every jump-designation address into a 3-bit code word, and feeds the 3-bit code word to the watermark mixer 111 and the data rearranging device 115 (see FIG. 14).

The copyright information and the jump-destination address (the 3-bit code word) fed to the watermark mixer 111 compose watermark information. The watermark mixer 111 embeds or inserts the watermark information into the input contents data to get watermarked contents data, that is, watermark-added contents data. The watermark mixer 111 outputs the watermark-added contents data to the MPEG encoder 114 (see FIG. 14). The watermark mixer 111 may directly output the watermark-added contents data to the data rearranging device 115 (see FIG. 14). In this case, the MPEG encoder 114 is omitted.

The MPEG encoder 114 compressively encodes the watermark-added contents data into watermark-added MPEG contents data according to a known MPEG encoding procedure. The MPEG encoder 114 outputs the watermark-added MPEG contents data to the data rearranging device 115.

The jump-destination address generator 113 notifies the data rearranging device 115 of a jump-designation address for each slice of the watermark-added contents data outputted from the watermark mixer 111 or the MPEG encoder 114. The data rearranging device 115 rearranges the slices of the watermark-added contents data from the watermark mixer 111 or the MPEG encoder 114 in an order being different from the raster scanning order and being determined by the jump-destination addresses. The data rearranging device 115 outputs the slices of the watermark-added contents data to the data writer 116 (see FIG. 14) in the rearranging-resultant order. Thus, the data rearranging device 115 converts the watermark-added contents data into second watermark-added contents data. The data rearranging device 115 outputs the second watermark-added contents data to the data writer 116. The data writer 116 changes the second watermark-added contents data into corresponding data of a prescribed format suited for being recorded on a recording medium 117 (see FIG. 14). The data writer 116 records the prescribed-record-format contents data on the recording medium 117.

The eighth embodiment of this invention will be further described below. Pieces of contents data for every frame are rearranged in an order different from a raster scanning order on a unit-by-unit basis (for example, a slice-by-slice basis) before being recorded on a recording medium. Jump-destination addresses relating to the data-piece rearrangement are embedded or inserted into the contents data as fragments of watermark information. For example, each slice is additionally provided with a jump-destination address (a 3-bit code word) representing the position of the head of a next slice which should follow the present slice in the raster scanning order. During playback, jump-destination addresses are reproduced, and jumps between slices are executed in response to the reproduced jump-destination addresses to provide a slice sequence accorded with the raster scanning order.

Slices are reproduced in the raster scanning order as shown in FIG. 21 so that every 1-frame picture represented by the slices is normally reproduced. Slices are rearranged in an order different from the raster scanning order before being recorded. As a result, the 1-frame picture represented by the slices is scrambled. FIG. 22 shows an example of the rearranging-resultant order which is caused by jumping some slices to previous positions or later positions for a frame. The jump-based slice rearrangement keeps prescribed rules such that the first and last slices for every frame remain corresponding to the uppermost and lowermost sub-regions respectively.

A jump-destination address is represented by a word of a 3-bit code for each slice. Every 3-bit code word indicates the type of a jump by which a related slice can be returned to its correct position in the raster scanning order. Specifically, a jump-destination-address code word of "000" indicates that a jump is unnecessary. A jump-destination-address code word of "001" indicates a jump by one slice in the downward direction. Here, the direction is defined with respect to corresponding sub-regions in a frame. A jump-destination-address code word of "010" indicates a jump by two slices in the downward direction. A jump-destination-address code word of "011" indicates a jump by three slices in the downward direction. A jump-destination-address code word of "100" indicates a jump by one slice in the upward direction. A jump-destination-address code word of "101" indicates a jump by two slices in the upward direction. A jump-destination-address code word of "110" indicates a jump by three slices in the upward direction. A jump-destination-address code word of "111" indicates a jump by four slices in the upward direction.

Regarding the rearranging-resultant order in FIG. 22, for every frame, jump-destination-code words are added to the ends of the slices respectively. For example, a jump-destination-address code word of "001" is added to the end of the first block. A jump-destination-address code word of "101" is added to the end of the second block.

In the eighth embodiment of this invention, watermark-added contents data stored in a recording medium 117 (see FIG. 18) have slices arranged in an order different from a raster scanning order. The stored watermark-added contents data include a set of audio information and video information placed in the slices. Alternatively, the stored watermark-added contents data may include video information (for example, still-picture information) placed in the slices. The stored watermark-added contents data also include a jump-destination-address code word for every slice which indicates the type of a jump by which the related slice can be returned to its correct position in the raster scanning order. The stored watermark-added contents data further include copyright information. The jump-destination-address code words and the copyright information compose watermark information.

At an initial stage of 1-frame reproduction of the watermark-added contents data from the recording medium 117, the data reader 121 (see FIG. 18) reads out the first slice of the watermark-added contents data from the recording medium 117. The data reader 121 feeds the first slice of the watermark-added contents data to the MPEG decoder 122 and the watermark detecting device 123 (see FIG. 18). The data reader 121 may directly feed the first slice of the watermark-added contents data to the display 124 (see FIG. 18). In this case, the MPEG decoder 122 is omitted. The watermark detecting device 123 extracts the watermark information from the first slice of the watermark-added contents data. The extracted watermark information includes the jump-destination-address code word relating to the first slice. The watermark detecting device 123 feeds the jump-destination-address code word to the jump-destination address calculator 125 (see FIG. 18). The jump-destination address calculator 125 computes a jump-destination address from the jump-destination-address code word. The jump-designation address denotes the position to which the currently-accessed point on the recording medium 117 should be jumped, that is, the position of the head of a slice to be accessed next. The jump-destination address calculator 125 notifies the data reader 121 of the computed jump-destination address. After the read-out of the first slice of the watermark-added contents data from the recording medium 117 has been completed, the data reader 121 jumps the currently-accessed point on the recording medium 117 to the position denoted by the jump-destination address and then starts reading out the second slice of the watermark-added contents data from the recording medium 117.

Similarly, the data reader 121 reads out the second and later slices of the watermark-added contents data from the recording medium 117. The data reader 121 feeds the second and later slices of the watermark-added contents data to the MPEG decoder 122 and the watermark detecting device 123. In the absence of the MPEG decoder 122, the data reader 121 directly feeds the second and later slices of the watermark-added contents data to the display 124. The watermark detecting device 123 extracts the watermark information from the second and later slices of the watermark-added contents data. The extracted watermark information includes the jump-destination-address code words relating to the second and later slices. The watermark detecting device 123 feeds the jump-destination-address code words to the jump-destination address calculator 125. The jump-destination address calculator 125 computes a jump-destination address from each of the jump-destination-address code words. The jump-designation address denotes the position to which the currently-accessed point on the recording medium 117 should be jumped, that is, the position of the head of a slice to be accessed next. The jump-destination address calculator 125 notifies the data reader 121 of the computed jump-destination addresses. After the read-out of the current slice of the watermark-added contents data from the recording medium 117 has been completed, the data reader 121 jumps the currently-accessed point on the recording medium 117 to the position denoted by the jump-destination address and then starts reading out the next slice of the watermark-added contents data from the recording medium 117.

The MPEG decoder 122 receives the slices of the watermark-added contents data from the data reader 121. The MPEG decoder 122 subjects the watermark-added contents data to an MPEG decoding procedure, thereby reproducing a video signal and an audio signal. The MPEG decoder 122 feeds the reproduced video signal to the display 124 (see FIG. 18). The reproduced video signal is indicated on the display 124. The MPEG decoder 122 feeds the reproduced audio signal to the loudspeaker 128 (see FIG. 18). The reproduced audio signal is converted into corresponding sounds by the loudspeaker 128.

In the absence of the MPEG decoder 122, the display 124 directly receives the slices of the watermark-added contents data from the data reader 121. The display 124 indicates a picture or pictures (for example, a still picture or still pictures) represented by the slices of the watermark-added contents data.

As understood from the previous description, the currently-accessed point on the recording medium 117 is jumped in response to each of the jump-destination-address code words. The jumps of the currently-accessed point in response to the jump-destination-address code words enable the slices of the watermark-added contents data to be sequentially reproduced in the raster scanning order.

When the jump-destination-address code words fail to be recovered, it is difficult to reproduce the slices of the watermark-added contents data in the raster scanning order. In the event that illegal conduct removes the watermark information from the watermark-added contents data, the jump-destination-address code words in the watermark information are also lost. Thus, in this case, the slices of the watermark-added contents data can not be reproduced in the raster scanning order. Accordingly, the watermark-added contents data are protected from illegal reproduction.

Ninth Embodiment

A ninth embodiment of this invention is similar to one of the sixth, seventh, and eighth embodiments thereof except for design changes mentioned hereafter.

Figure 23:
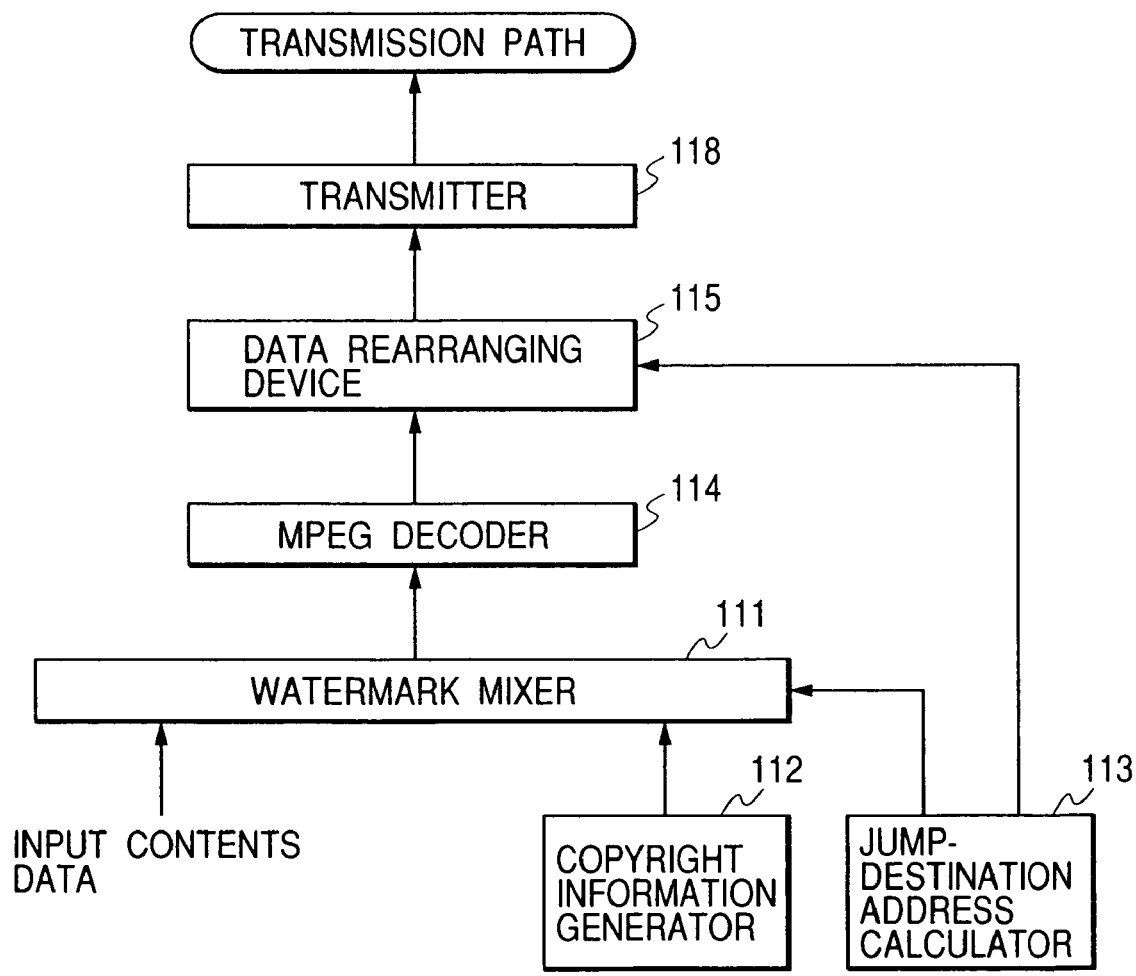
FIG. 23 is a block diagram of an apparatus for embedding a watermark into contents data according to a ninth embodiment of this invention.

FIG. 23 shows an apparatus for embedding or inserting a watermark into contents data according to the ninth embodiment of this invention. The apparatus of FIG. 23 includes a transmitter 118 connected between the data rearranging device 115 and a transmission path. The transmitter 118 receives the rearranged contents data (the rearranged-resultant watermark-added MPEG contents data) from the data rearranging device 115. The transmitter 118 outputs the rearranged contents data to the transmission path. The rearranging-resultant contents data propagate along the transmission path. Preferably, the transmitter 118 implements format conversion of the rearranged contents data before outputting the resultant data to the transmission path.

The transmission path includes a communication network such as a wire communication network, a radio communication network, or the Internet.

Figure 24:
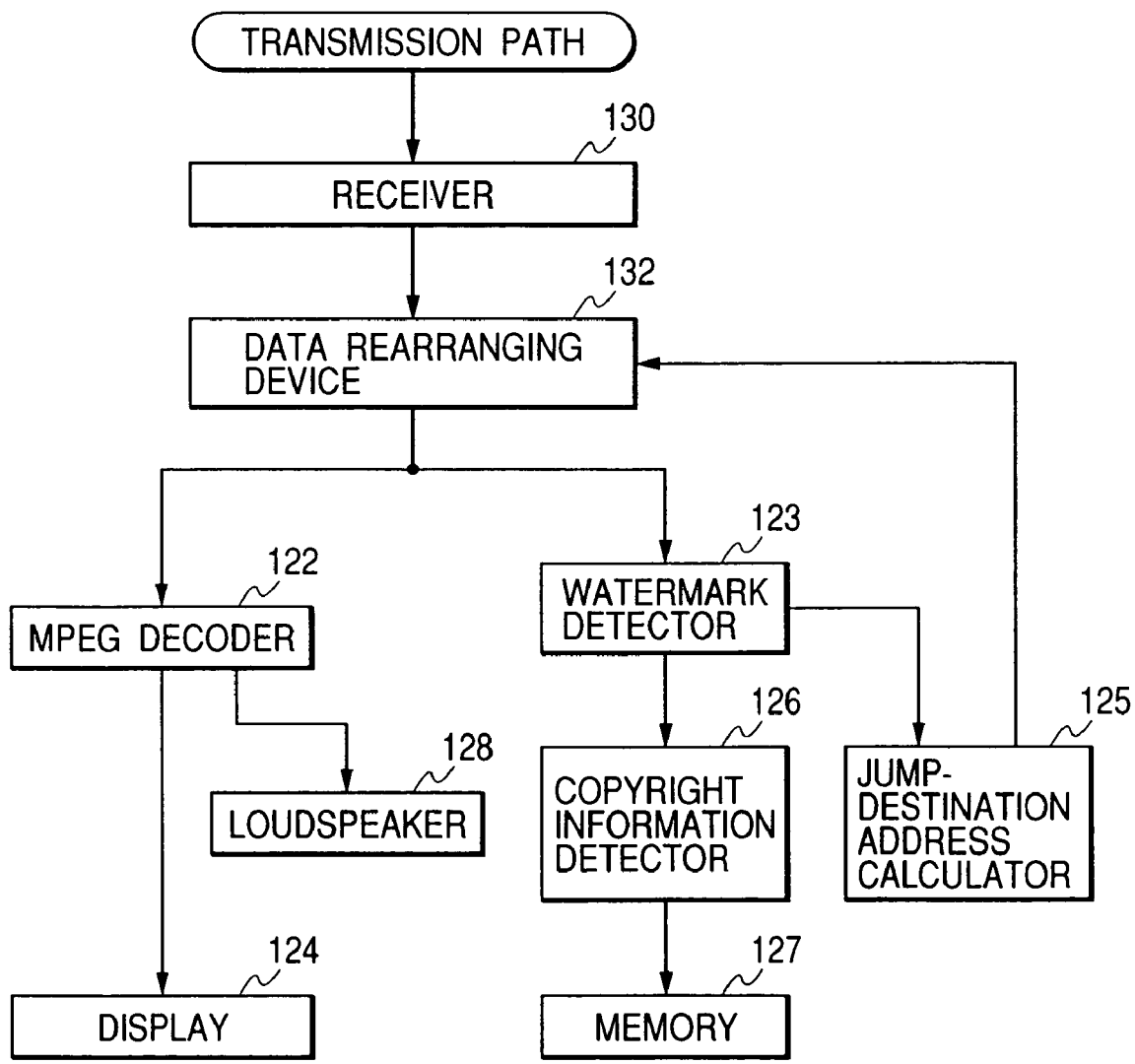
FIG. 24 is a block diagram of an apparatus for reproducing a watermark from watermarked contents data according to the ninth embodiment of this invention.

FIG. 24 shows an apparatus for reproducing or extracting a watermark from watermarked contents data (watermark-added contents data) according to the ninth embodiment of this invention. The apparatus of FIG. 24 includes a receiver 130 and a data rearranging device 132 which correspond to the data reader 121 in the apparatus of FIG. 18. The receiver 130 is connected between a transmission path and the data rearranging device 132. The data rearranging device 132 is connected with the MPEG decoder 122, the watermark detecting device 123, and the jump-destination address calculator 125. The device 130 receives watermark-added contents data from the transmission path. Originally, the watermark-added contents data are transmitted by, for example, the apparatus of FIG. 23. The receiver 130 feeds the received watermark-added contents data to the data rearranging device 132. Preferably, the receiver 130 implements format conversion of the received watermark-added contents data before feeding the resultant data to the data rearranging device 132. The jump-destination address calculator 125 notifies the data rearranging device 132 of the computed jump-destination addresses. The data rearranging device 132 rearranges the watermark-added contents data in response to the jump-destination addresses, thereby making them into agreement with the original order. The data rearranging device 132 feeds the resultant watermark-added contents data to the MPEG decoder 122 and the watermark detecting device 123. The data rearrangement by the data rearranging device 132 is inverse with respect to that by the data rearranging device 115 (see FIG. 23).

The data rearranging device 132 includes a buffer memory and a read/write circuit. Under the control by the read/write circuit, the watermark-added contents data outputted from the receiver 130 are stored in the buffer memory. Under the control by the read/write circuit, the watermark-added contents data are read out from the buffer memory before being fed to the MPEG decoder 122 and the watermark detecting device 123. The read/write circuit controls the sequence of the read-out of the watermark-added contents data from the buffer memory in response to the jump-destination addresses so that the watermark-added contents data outputted from the buffer memory will be in the original order.

What is claimed is:

1. An apparatus for embedding a watermark into contents data, comprising:
   address generating means for indicating a jump destination for each of prescribed unit portions of compressively encoded data, and thereby designating an arrangement order different from an order of reproducing the prescribed unit portions and generating a jump-destination address which affects reproduction of contents data;
   information generating means for generating copyright information;
   mixing means for embedding the jump-destination address generated by the address generating means and the copyright information generated by the information generating means into input contents data as watermark information to generate first watermark-added contents data;
   an encoder for compressively encoding the first watermark-added contents data generated by the mixing means into second watermark-added contents data; and
   rearranging means for rearranging prescribed unit portions of the second watermark-added contents data generated by the encoder in response to the jump-destination address generated by the address generating means into an order different from the order of reproducing the prescribed unit portions;
   wherein:
   the address generating means includes means for indicating a jump destination for each of cells of compressively encoded data, and thereby designating an arrangement time order different from a time order of reproducing the cells and generating a jump-destination address which affects reproduction of contents data;
   the mixing means includes means for embedding the jump-destination address generated by the means included in the address generating means and the copyright information generated by the information generating means into the input contents data as the watermark information to generate the first watermark-added contents data; and
   the rearranging means includes means for rearranging cells of the second watermark-added contents data generated by the encoder in response to the jump-destination address generated by the means included in the address generating means into a time order different from the time order of reproducing the cells.

2. An apparatus for embedding a watermark into contents data, comprising:
   address generating means for indicating a jump destination for each of prescribed unit portions of compressively encoded data, and thereby designating an arrangement order different from an order of reproducing the prescribed unit portions and generating a jump-destination address which affects reproduction of contents data, wherein the prescribed unit portions correspond to one frame represented by the compressively encoded data;
   information generating means for generating copyright information;
   mixing means for embedding the jump-destination address generated by the address generating means and the copyright information generated by the information generating means into input contents data as watermark information to generate first watermark-added contents data;
   an encoder for compressively encoding the first watermark-added contents data generated by the mixing means into second watermark-added contents data; and
   rearranging means for rearranging prescribed unit portions of the second watermark-added contents data generated by the encoder in response to the jump-destination address generated by the address generating means into an order different from the order of reproducing the prescribed unit portions;
   wherein:
   the address generating means includes means for indicating a jump destination for each of cells of compressively encoded data, and thereby designating an arrangement time order different from a time order of reproducing the cells and generating a jump-destination address which affects reproduction of contents data;

the mixing means includes means for embedding the jump-destination address generated by the means included in the address generating means and the copyright information generated by the information generating means into the input contents data as the watermark information to generate the first watermark-added contents data; and the rearranging means comprises means for rearranging cells of the second watermark-added contents data generated by the encoder in response to the jump-destination address generated by the means included in the address generating means into a time order different from the time order of reproducing the cells.

3. An apparatus for reproducing original contents data from watermarked contents data generated by (1) indicating a jump destination for each of prescribed unit portions of compressively encoded data, and thereby designating an arrangement order different from an order of reproducing the prescribed unit portions and generating a jump-destination address which affects reproduction of contents data, (2) generating copyright information, (3) embedding the jump-destination address and the copyright information into input contents data as watermark information to generate first watermark-added contents data, (4) compressively encoding the first watermark-added contents data into second watermark-added contents data, and (5) rearranging prescribed unit portions of the second watermark-added contents data in response to the jump-destination address into an order different from the order of reproducing the prescribed unit portions, the apparatus comprising:

data reading means for reading input watermarked encoded contents data;

watermark information detecting means for detecting a jump-destination address from the input watermarked encoded contents data read by the data reading means;

address calculating means for calculating a data reading address for each of the prescribed unit portions from the jump-destination address detected by the watermark information detecting means, and outputting the calculated address to the data reading means and thereby enabling the data reading means to read the prescribed unit portions of the input watermarked encoded contents data in an original normal order; and a decoder for decoding the input watermarked encoded contents data read by the data reading means into watermarked decoded contents data;

wherein the watermarked contents data is generated by (1) indicating a jump destination for each of cells of the compressively encoded data, and thereby designating an arrangement time order different from a time order of reproducing the cells and generating a jump-destination address which affects reproduction of contents data, (2) generating the copyright information, (3) embedding said generated jump-destination address and said generated copyright information into input contents data as watermark information to generate the first watermark-added contents data, (4) compressively encoding the first watermark-added contents data into the second watermark-added contents data, and (5) rearranging cells of the second watermark-added contents data in response to said generated jump-destination address into a time order different from the time order of reproducing the cells.

4. An apparatus for reproducing original contents data from watermarked contents data generated by (1) indicating a jump destination for each of prescribed unit portions of compressively encoded data, and thereby designating an arrangement order different from an order of reproducing the prescribed unit portions and generating a jump-destination address which affects reproduction of contents data, wherein the prescribed unit portions correspond to one frame represented by the compressively encoded data, (2) generating copyright information, (3) embedding the jump-destination address and the copyright information into input contents data as watermark information to generate first watermark-added contents data, (4) compressively encoding the first watermark-added contents data into second watermark-added contents data, and (5) rearranging prescribed unit portions of the second watermark-added contents data in response to the jump-destination address into an order different from the order of reproducing the prescribed unit portions, the apparatus comprising:

data reading means for reading input watermarked encoded contents data;

watermark information detecting means for detecting a jump-destination address from the input watermarked encoded contents data read by the data reading means;

address calculating means for calculating a data reading address for each of the prescribed unit portions from the jump-destination address detected by the watermark information detecting means, and outputting the calculated address to the data reading means and thereby enabling the data reading means to read the prescribed unit portions of the input watermarked encoded contents data in an original normal order; and a decoder for decoding the input watermarked encoded contents data read by the data reading means into watermarked decoded contents data;

wherein the watermarked contents data is generated by (1) indicating a jump destination for each of cells of the compressively encoded data, and thereby designating an arrangement time order different from a time order of reproducing the cells and generating a jump-destination address which affects reproduction of contents data, (2) generating the copyright information, (3) embedding said generated jump-destination address and said generated copyright information into input contents data as watermark information to generate the first watermark-added contents data, (4) compressively encoding the first watermark-added contents data into the second watermark-added contents data, and (5) rearranging cells of the second watermark-added contents data in response to said generated jump-destination address into a time order different from the time order of reproducing the cells.

5. A recording medium for storing watermarked contents data generated by (1) indicating a jump destination for each of prescribed unit portions of compressively encoded data, and thereby designating an arrangement order different from an order of reproducing the prescribed unit portions and generating a jump-destination address which affects reproduction of contents data, (2) embedding the jump-destination address and copyright information into input contents data as watermark information to generate first watermark-added contents data, (3) compressively encoding the first watermark-added contents data into second watermark-added contents data, and (4) rearranging prescribed unit portions of the second watermark-added contents data in response to the jump-destination address into an order different from the order of reproducing the prescribed unit portions;

wherein the watermarked contents data is generated by (1) indicating a jump destination for each of cells of the compressively encoded data, and thereby designating an arrangement time order different from a time order of reproducing the cells and generating a jump-destination address which affects reproduction of contents data, (2) embedding said generated jump-destination address and the copyright information into input contents data as watermark information to generate the first watermark-added contents data, (3) compressively encoding the first watermark-added contents data into the second watermark-added contents data, and (4) rearranging cells of the second watermark-added contents data in response to said generated jump-destination address into a time order different from the time order of reproducing the cells.

6. A recording medium for storing watermarked contents data generated by (1) indicating a jump destination for each of prescribed unit portions of compressively encoded data, and thereby designating an arrangement order different from an order of reproducing the prescribed unit portions and generating a jump-destination address which affects reproduction of contents data, wherein the prescribed unit portions correspond to one frame represented by the compressively encoded data, (2) embedding the jump-destination address and copyright information into input contents data as watermark information to generate first watermark-added contents data, (3) compressively encoding the first watermark-added contents data into second watermark-added contents data, and (4) rearranging prescribed unit portions of the second watermark-added contents data in response to the jump-destination address into an order different from the order of reproducing the prescribed unit portions;

wherein the watermarked contents data is generated by (1) indicating a jump destination for each of cells of the compressively encoded data, and thereby designating an arrangement time order different from a time order of reproducing the cells and generating a jump-destination address which affects reproduction of contents data, (2) embedding said generated jump-destination address and the copyright information into input contents data as watermark information to generate the first watermark-added contents data, (3) compressively encoding the first watermark-added contents data into the second watermark-added contents data, and (4) rearranging cells of the second watermark-added contents data in response to said generated jump-destination address into a time order different from the time order of reproducing the cells.

* * * * *